US010712453B2

(12) United States Patent
Ota et al.

(10) Patent No.: US 10,712,453 B2
(45) Date of Patent: Jul. 14, 2020

(54) DETECTION ELEMENT

(71) Applicant: DAI NIPPON PRINTING Co., Ltd., Tokyo (JP)

(72) Inventors: Kohei Ota, Tokyo (JP); Tomohisa Motomura, Tokyo (JP); Takamasa Takano, Tokyo (JP); Koichi Nakayama, Tokyo (JP)

(73) Assignee: DAI NIPPON PRINTING Co., Ltd., Tokyo (JP)

( * ) Notice: Subject to any disclaimer, the term of this patent is extended or adjusted under 35 U.S.C. 154(b) by 93 days.

(21) Appl. No.: 15/944,837

(22) Filed: Apr. 4, 2018

(65) Prior Publication Data

US 2018/0246226 A1 Aug. 30, 2018

Related U.S. Application Data

(63) Continuation of application No. PCT/JP2016/079110, filed on Sep. 30, 2016.

(30) Foreign Application Priority Data

Oct. 8, 2015 (JP) .................................. 2015-200561
Oct. 9, 2015 (JP) .................................. 2015-201243

(51) Int. Cl.
*G01T 1/185* (2006.01)
*H01J 47/06* (2006.01)
(52) U.S. Cl.
CPC .............. *G01T 1/185* (2013.01); *H01J 47/06* (2013.01)
(58) Field of Classification Search
CPC .............. H01L 2224/0555; H05K 2201/09609
See application file for complete search history.

(56) References Cited

U.S. PATENT DOCUMENTS

| 4,303,798 A | 12/1981 | Paunovic |
| 5,442,143 A * | 8/1995 | Schmidt ............... H05K 1/0287 174/257 |
| 7,091,589 B2 * | 8/2006 | Mori ................. H01L 23/49822 257/686 |
| 2002/0134945 A1 | 9/2002 | Tanimori et al. |

(Continued)

FOREIGN PATENT DOCUMENTS

| CN | 102150246 A | 8/2011 |
| EP | 2141511 A2 | 1/2010 |

(Continued)

OTHER PUBLICATIONS

International Search Report dated Dec. 13, 2016 for PCT Application PCT/JP2016/079110 with English Translation.

(Continued)

*Primary Examiner* — Kenneth J Malkowski
(74) *Attorney, Agent, or Firm* — Michael Best & Friedrich LLP

(57) ABSTRACT

A detection element can obtain a high-resolution radiation image having a high signal intensity and a high S/N ratio. A detection element including a substrate having a through hole, an insulating layer arranged inside of the through hole, a through electrode arranged further to the inner side of the through hole than the insulating layer, a resin layer having insulating properties and having an opening portion exposing the through electrode, a first electrode arranged above the through electrode and the resin layer, the first electrode being connected to the through electrode through the opening portion, and a second electrode arranged above the resin layer, the second electrode being separated from the first electrode.

12 Claims, 27 Drawing Sheets

(56) References Cited

U.S. PATENT DOCUMENTS

| | | | | |
|---|---|---|---|---|
| 2007/0108591 A1* | 5/2007 | Sunohara | ............... | H01L 21/486 257/700 |
| 2010/0164120 A1* | 7/2010 | Nakayama | ............ | H01L 21/486 257/774 |
| 2011/0062594 A1 | 3/2011 | Maekawa et al. | | |

FOREIGN PATENT DOCUMENTS

| | | | |
|---|---|---|---|
| JP | S55-145397 | A | 11/1980 |
| JP | 3354551 | B2 | 12/2002 |
| JP | 3535045 | B2 | 6/2004 |
| JP | 2009-264997 | A | 11/2009 |
| JP | 4391391 | B2 | 12/2009 |
| JP | 2010-118645 | A | 5/2010 |
| JP | 2011-017695 | A | 1/2011 |
| JP | 2015-111057 | A | 6/2015 |

OTHER PUBLICATIONS

Written Opinion of the International Searching Authority dated Dec. 13, 2016 for PCT Application PCT/JP2016/079110 with English Translation.

Japanese Office Action dated Jan. 30, 2018 for corresponding Japanese Application No. 2017-544471, with partial translation.

Japanese Office Action dated May 7, 2019, for the corresponding Japanese application No. 2018-072218. With Partial English machine translation.

Atsuhiko Ochi et al, Development of μ-PIC with resistive cathode, IEEE Nuclear Science Symposium & Medical Imaging Conference, Nov. 6, 2010, 958-961, 12060660, IEEE, USA. Cited in Non-Patent Literature Document No. 1.

Japanese Notice of Allowance dated Jul. 9, 2019 for the corresponding Japanese application No. 2018-072218. With Partial English machine translation.

Chinese Office Action dated Nov. 29, 2019 for the corresponding Chinese application No. 201680059153.0, with partial English translation.

Article 94(3) issued on Dec. 11, 2019 for the corresponding European application No. 16853490.7.

Extended European Search Report dated May 7, 2019 for the corresponding European application No. 16853490.7.

Chinese Office Action dated Jun. 25, 2019 for the corresponding Chinese application No. 201680059153.0, with partial English translation.

* cited by examiner

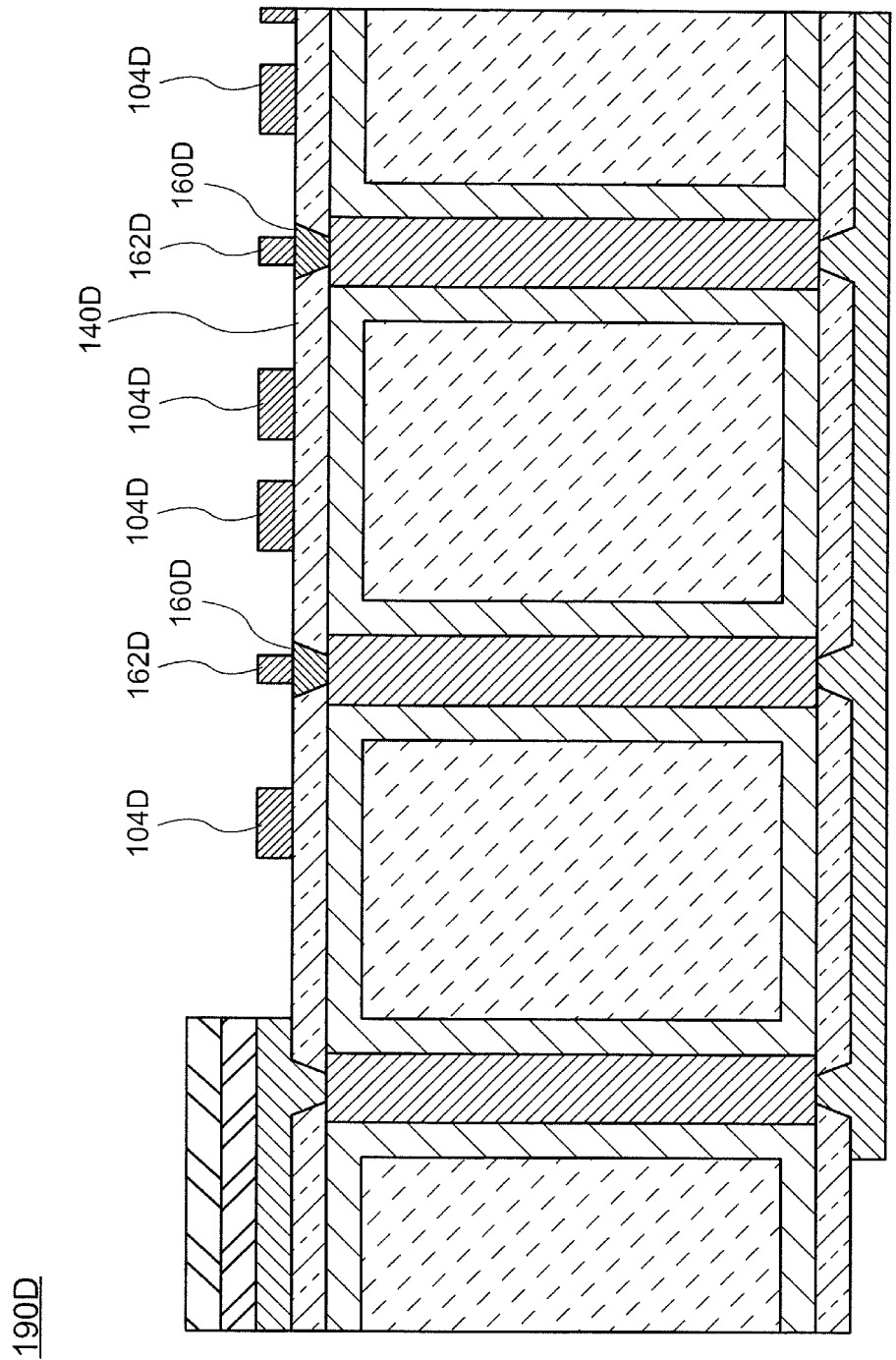

DETECTION ELEMENT

CROSS REFERENCE TO RELATED APPLICATIONS

This application is a U.S. continuation application filed under 35 U.S.C. § 111(a), of International Application No. PCT/JP2016/079110, filed on Sep. 30, 2016, which claims priority to Japanese Patent Application No. 2015-200561 filed on Oct. 8, 2015 and Japanese Patent Application No. 2015-201243, filed on Oct. 9, 2015, the disclosures of which are incorporated by reference.

FIELD

The present invention relates to a detection element.

BACKGROUND

Research into gas electron amplification type radiation detectors using pixel type electrodes is proceeding. In radiation detection by a conventional detector, large area and real-time imaging can not be sufficiently realized in image imaging of the detection region. On the other hand, the gas electron amplification type radiation detector is characterized by being capable of real-time image imaging with a large area.

Regarding the structure of the gas electron amplification type radiation detector, for example, reference can be made to Japanese Laid Open Patent Application Publication No. 2015-111057, Japanese Patent No. 3354551, Japanese Patent No. 4391391 and Japanese Patent No. 3535045.

In the radiation detector of Japanese Laid Open Patent Application Publication No. 2015-111057, as is shown in FIG. 6 of Japanese Laid Open Patent Application Publication No. 2015-111057, for example, a through hole is filled with a through electrode and an upper end is constricted by an insulating resin layer so that an anode electrode having a size smaller than that of the through electrode within the through hole is formed. However, in this structure, since the upper end part of the anode electrode where an electric field is the most concentrated is in contact with the resin layer, problems occurred such as an inability to obtain a sufficient electric field intensity or disorder of an electric field. As a result, it was difficult to stably obtain a high gas amplification ratio. That is, it was difficult to realize a radiation detector which could obtain a high-resolution radiation image having a high signal intensity and a high S/N ratio.

SUMMARY

A detection element according to one embodiment of the present invention includes a substrate having a through hole, an insulating layer arranged inside of the through hole, a through electrode arranged further to an inner side of the through hole than the insulating layer, a resin layer having insulating properties and having an opening portion exposing the through electrode, a first electrode arranged above the through electrode and the resin layer, the first electrode being connected to the through electrode through the opening portion, and a second electrode arranged above the resin layer, the second electrode being separated from the first electrode, wherein a part of the resin layer is in contact with the through electrode.

In addition, the detection element may further include a third electrode, wherein the substrate has a first surface and a second surface on the opposite side to the first surface with respect to the substrate, the third electrode is arranged on the second surface, and a direction in which the second electrode extends and a direction in which the third electrode extends mutually intersect each other.

In addition, a plurality of the first electrodes may be arranged and the plurality of the first electrodes may be arranged in a matrix shape along a direction in which the second electrode extends and along a direction in which the third electrode extends.

In addition, the second electrode may be opened so as to surround the first electrode.

In addition, a first opening size of the opening portion may be smaller than a size of the through electrode in a region where the through electrode and the resin layer are in contact.

In addition, a thickness of the insulating layer may be 0.1 µm or more and 35 µm or less.

In addition, the insulating layer may include a silicon oxide layer and a silicon nitride layer, and the silicon nitride layer may be arranged further to the inner side of the through hole than the silicon oxide layer.

In addition, the insulating layer may have a structure in which alternately stacked with a plurality of layers having tensile stress and a plurality of layers having compressive stress.

In addition. a size of the first electrode may be larger than a size of a second opening in an upper part of the opening portion.

In addition, a size of the first electrode may be substantially the same as a size of the second opening in an upper part of the opening portion.

In addition, a size of the first electrode may be smaller than a size of the second opening in an upper part of the opening portion.

In addition, the opening portion may have a taper shape where a size of the opening portion increases according to a difference from the substrate.

According to one embodiment of the present invention, a detection element is provided including a substrate having a first surface and a second surface mutually facing each other and having a through hole passing through from the first surface to the second surface, an insulating layer arranged on the first surface, the second surface and a side wall of the through hole, a through electrode arranged further to the inner side of the through hole than the insulating layer, a first insulating resin layer arranged on the first surface side and having a first opening portion surrounding the through electrode, a first electrode arranged on the first surface side and inside of the first opening portion, the first electrode being connected to the through electrode, and a second electrode arranged above the first insulating resin layer, the second electrode having a second opening portion surrounding the first electrode, wherein a distance from an end part of the first electrode to an end part of the first opening portion is ⅓ or more and ⅔ or less with respect to the distance of a line segment connecting the end part of the first electrode and an end part of the second opening portion at the shortest distance.

In addition, the first electrode may be circular (radius $R_1$), the second opening portion may be a concentric circle (radius $R_2$) of the first electrode, and an end part of the first opening portion may be located in a range from the center of the first electrode $(2R_1+R_2)/3$ or more and $(R_1+2R_2)/3$ or less.

In addition, the detection element may further include a third electrode arranged on the second surface side, wherein a direction in which the second electrode extends may intersect a direction in which the third electrode extends.

In addition, a plurality of the first electrodes may be arranged and the plurality of the first electrodes may be arranged in a matrix shape along a direction in which the second electrode extends and along a direction in which the third electrode extends.

In addition, a thickness of the insulating layer may be 1 μm or more and 50 μm or less.

In addition, the insulating layer may have a structure in which a plurality of layers having tensile stress and a plurality of layers having compressive stress are alternately stacked.

In addition, the detection element may further include a second insulating resin layer arranged on the second surface and closing the through hole.

In addition, the substrate may include a region in which the insulating layer, the first insulating resin layer and the first electrode are stacked in this order from the substrate side on the first surface side, the substrate may include a region in which the insulating layer, a second insulating resin layer and the third electrode are stacked in this order from the substrate side on the second surface side, and a space of the first surface side and a space of the second surface side may be continuous through the through hole.

In addition, the $R_1$ may be equivalent to a radius of the through hole.

In addition, an inner side of the through hole from the through electrode may be filled with a resin.

In addition, both end parts of the through hole may be closed by a resin.

In addition, the first opening portion may have a taper shape where a size of the first opening portion increases according to a difference from the substrate.

BRIEF DESCRIPTION OF DRAWINGS

FIG. 20 is a cross-sectional view of a part of a detection element according to one embodiment of the present disclosure;

DESCRIPTION OF EMBODIMENTS

Figure 1:
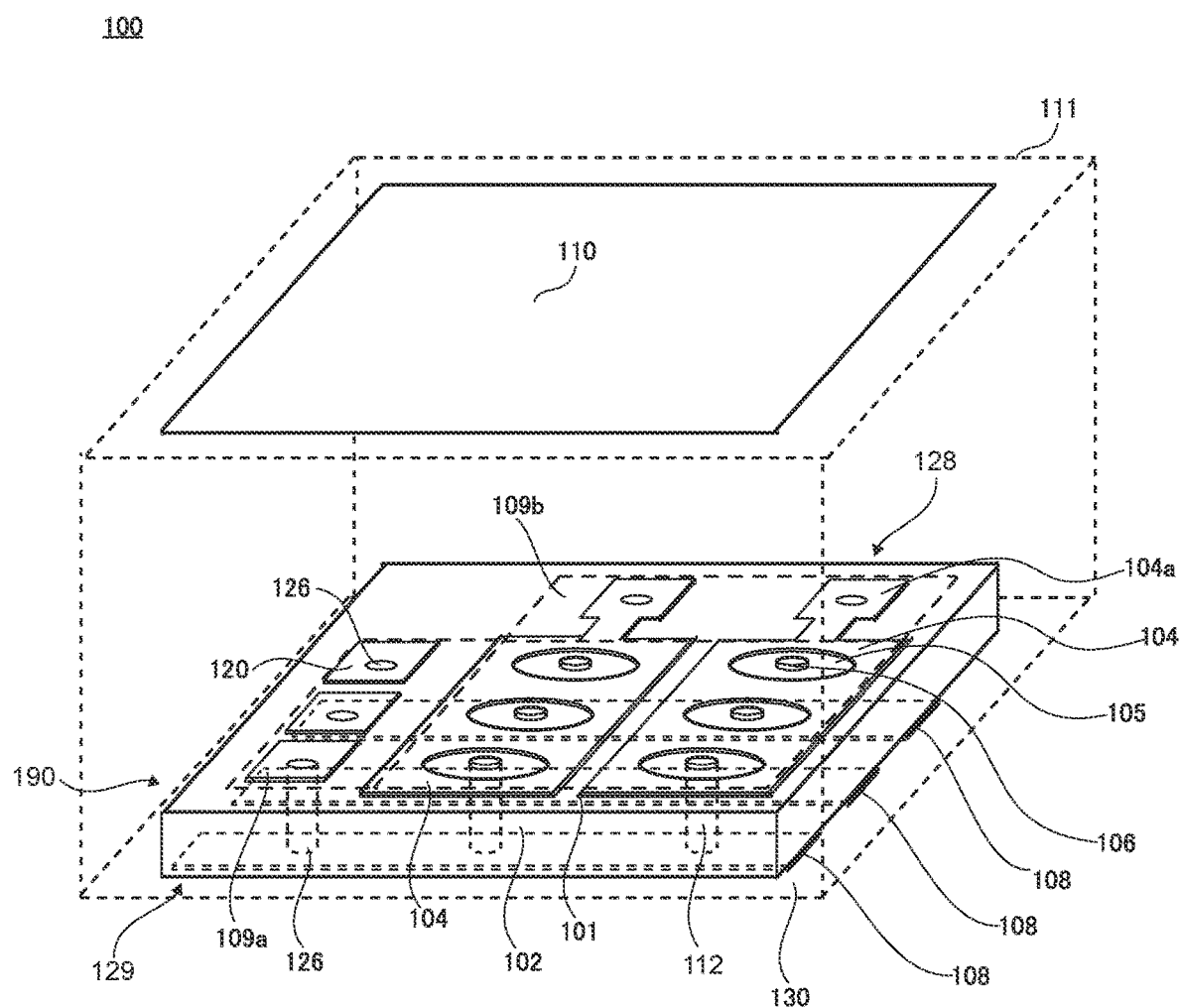
FIG. 1 is a schematic structural diagram of a pixel electrode portion of a radiation detection device according to one embodiment of the present disclosure.

The detection element of the present disclosure is explained in detail below while referring to the drawings. Furthermore, the detection element of the present disclosure is not limited to the following embodiments, and various modifications can be made and carried out. In all the embodiments, the same components are denoted by the same reference numerals. In addition, for the convenience of explanation, the dimensional ratios in the drawings may be different from actual ratios, or a part of the structure may be omitted from the drawings. Although the explanation will be made using the phrases "upward" or "downward" for the convenience of explanation, components may be arranged so that the vertical relationship between a first member and a second member is opposite to that shown in the drawing, for example. In addition, in the following explanation, a first surface and a second surface of a substrate do not refer to a specific surface of a substrate, but rather identify a front surface direction or rear surface direction of the substrate. That is, they are names which specify the upward and downward with respect to the substrate.

(Background to the Invention)

Figure 2:
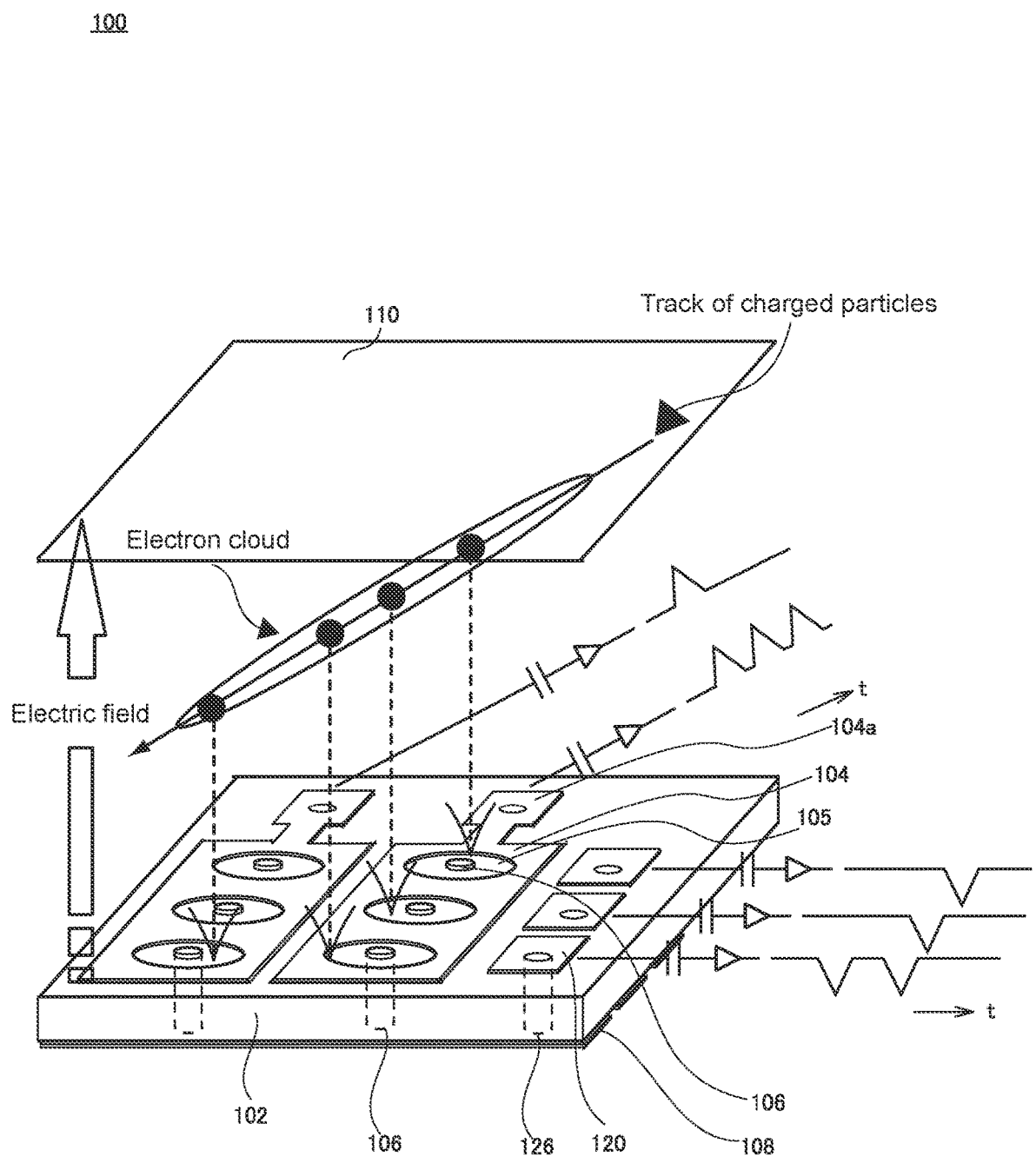
FIG. 2 is a diagram showing the operating principle of a radiation detection device according to one embodiment of the present disclosure.
Figure 3:
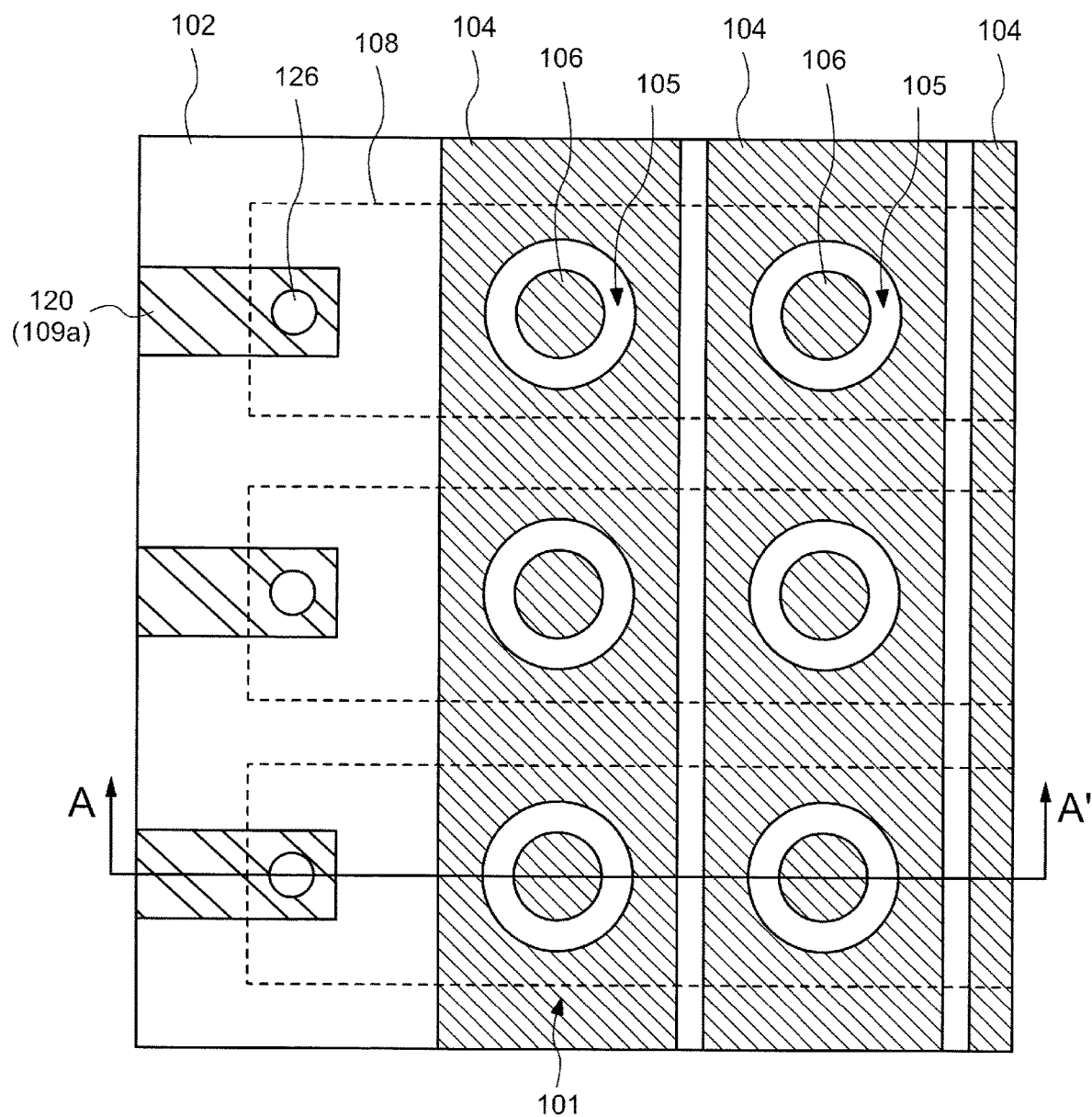
FIG. 3 is a planar view of a part of a detection element according to one embodiment of the present disclosure.

In a radiation detector (referred to as "conventional radiation detector" below) such as that disclosed in Patent Document 1, it has been understood that hydrogen and moisture are generated at the interface between an insulating layer arranged inside a through hole and a through electrode arranged inside of the through hole. For example, as is shown in FIG. 2 and FIG. 3 of Patent Document 1, in the case where the upper end part of a via conductive layer protrudes above the substrate, the movement of the hydrogen and the moisture are moved by a bent part of the via conductive layer in the vicinity of the substrate surface. Therefore, the hydrogen and the moisture are filled into the inside of the through hole without being discharged to the exterior. It has been found that the through hole and the through electrode are broken when the internal pressure inside the through hole exceeds an allowable value by the generation of hydrogen and moisture.

Figure 6:
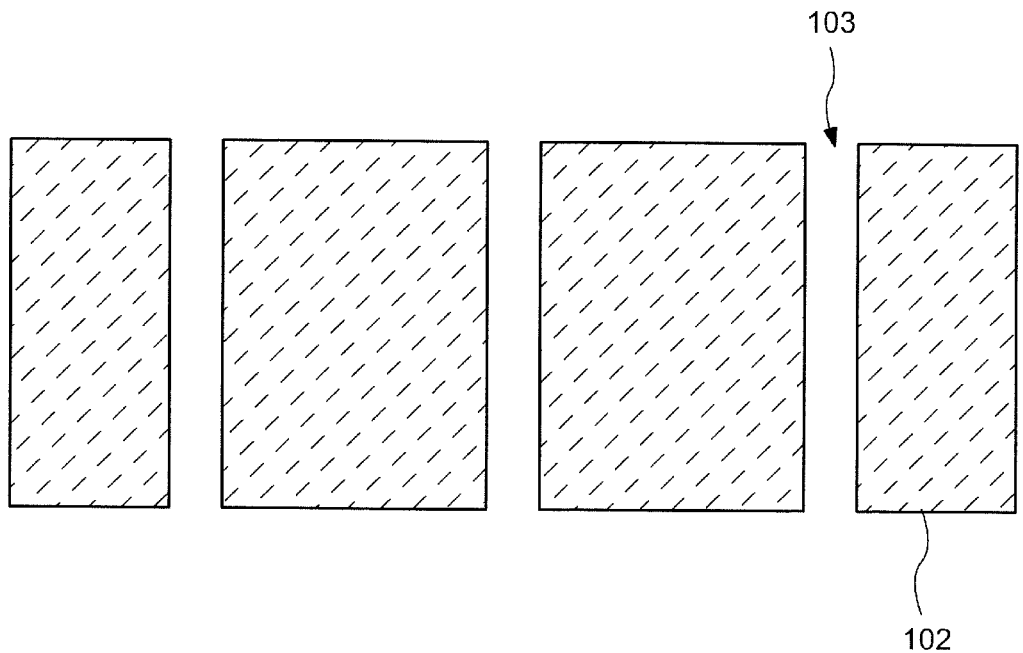
FIG. 6 is a diagram showing a process of forming a through hole in a substrate in a manufacturing method of a detection element according to one embodiment of the present disclosure.

In order to solve this problem, it has been found that it is effective to form an insulating resin layer so as to contact with the interface between the through electrode and the insulating layer as is shown in FIG. 6 of Patent Document 1. However, in FIG. 6 of Patent Document 1, as is described above, problems such as the inability to obtain a sufficient electric field intensity or disorder of the electric field. Therefore, the present inventors have conducted intensive studies on the phenomenon described above and, as a result, have reached the present invention.

Therefore, an object of the present disclosure is to provide a detection element which can obtain a high-resolution radiation image having a high signal intensity and a high S/N ratio.

First Embodiment

FIG. 1 shows a schematic structural diagram of a pixel electrode portion 101 of a radiation detection device 100 according to the present disclosure according to the present embodiment. The radiation detection device 100 according to the embodiment of the present disclosure includes a pixel electrode portion 101, connection terminal units 109 (109*a* and 109*b*), a drift electrode 110 and a chamber 111. The pixel electrode portion 101 and the connection terminal unit 109 (109*a* and 109*b*) are also referred to as a detection element 190.

[Structure of Radiation Detection Device 100]

The pixel electrode portion 101 of the radiation detection device 100 according to the present disclosure according to the present embodiment includes a substrate 102, a cathode electrode 104, an anode electrode 106, an anode electrode pattern 108 and a through electrode 112.

A plurality of cathode electrodes 104 are arranged on the surface (first surface 128) of the substrate 102. The cathode electrode 104 has a plurality of opening portions 105. Since the cathode electrode 104 is formed in a strip shape, it is also referred to as a cathode strip electrode.

The anode electrode 106 is exposed at each of the plurality of opening portions 105 of the cathode electrode 104.

The through electrode 112 is arranged in a through hole arranged in the substrate from the front surface to the rear surface (second surface 129 opposite to the first surface 128). In the present embodiment, the through electrode 112 is connected to the anode electrode 106 on the front surface side of the substrate 102, and the through electrode 112 is connected to the anode electrode pattern 108 on the rear surface side of the substrate 102.

The plurality of anode electrodes 106 arranged in the plurality of opening portions 105 provided in one cathode electrode 104 are connected to the plurality of anode electrode patterns 108 via the through electrode 112 respectively. The anode electrode pattern 108 extends from a position at which the plurality of anode electrodes 106 are arranged to a position at which the connection terminal portion 109a is arranged. The direction in which the cathode electrode 104 extends and the direction in which the anode electrode pattern 108 extends are substantially orthogonal. The anode electrode 106 is arranged at a position where the cathode electrode 104 and the anode electrode pattern 108 intersect.

In other words, it can be said that the anode electrode 106 is arranged in a matrix shape along the direction in which the cathode electrode 104 extends and the direction in which the anode electrode pattern 108 extends. In other words, it can be said that a plurality of "pixels" including the anode electrode 106 and a part of the cathode electrode 104 are arranged in the radiation detection device 100. Here, in the present embodiment, although a structure in which the cathode electrode 104 and the anode electrode pattern 108 are substantially orthogonal is exemplified, the invention is not limited to this structure. For example, the cathode electrode 104 and the anode electrode pattern 108 may be inclined and intersect each other.

Furthermore, although the anode electrode 106, the anode electrode pattern 108, and the through electrode 112 are separately provided and electrically connected to each other is explained in the present embodiment, the present invention is not limited thereto. For example, a part or the whole of the anode electrode 106, the anode electrode pattern 108 and the through electrode 112 may be integrally formed. Since the anode electrode pattern 108 is formed in a strip shape, it is also referred to as an anode strip pattern.

The anode electrode 106 may be referred to as a first electrode, the cathode electrode 104 as a second electrode, and the anode electrode pattern 108 as a third electrode.

The connection terminal portion 109a is connected to the anode electrode pattern 108 through the via 126. Although a structure in which the connection terminal portion 109a and the via 126 are separately formed is exemplified in the present embodiment, the structure is not limited to this. For example, the connection terminal portion 109a and the via 126 may be integrally formed. In addition, although the anode electrode pattern 108 and the via 126 are separately formed in the present embodiment, the structure is not limited thereto. For example, the anode electrode pattern 108 and the via 126 may be integrally formed.

The connection terminal portion 109b has an electrode 104a in which the cathode electrode 104 is extends.

A voltage is applied between the cathode electrode 104 and the anode electrode 106 and an electric field is formed.

The radiation detection device 100 includes a drift electrode 110 arranged facing a plurality of anode electrodes 106 arranged in a matrix shape and a chamber 111 for storing the plurality of anode electrodes 106 and the drift electrode 110 therein. The cathode electrode 104 is connected to GND. A voltage is applied between the drift electrode 110 and the cathode electrode 104 to form an electric field. A mixed gas of [a rare gas such as argon or xenon] and [a gas (quenching gas) having a quenching action including gaseous alkane at room temperature such as ethane or methane or carbon dioxide is sealed inside the chamber 111. Furthermore, these gases may be singly sealed inside the chamber 111 or mixed gases of two or more kinds may be sealed.

[Operation of Radiation Detection Device 100]

Here, the operating principle of the radiation detection device 100 according to the present disclosure according to the present embodiment is shown in FIG. 2. In the radiation detection device 100 according to the embodiment of the present disclosure according to the present embodiment, due to the influence of an electric field generated between the drift electrode 110 and the cathode electrode 104, an electron cloud is formed by the interaction between the incident radiation and gas present inside the chamber 111. Each electron of the electron cloud is attracted to the pixel electrode portion 101. At this time, the attracted electrons collide with and ionize the gas. Furthermore, the ionized electrons are attracted to the anode electrode 106 as an electron group while growing like an avalanche. The electron group collected by the anode electrode 106 in this way increases to an extent that it can be read out as an electric signal. Next, this electric signal is read out from the connection terminal portion 109a to the exterior through the anode electrode pattern 108. On the other hand, a positive charge which is induced by the electron group is attracted to the cathode electrode 104. The electric signal caused by the positive charge collected by the cathode electrode 104 is read out from the connection terminal portion 109b to the exterior. The track of the charged particles can be measured by measuring these electrical signals in time series.

[Structure of Pixel Electrode Portion 101 and Connection Terminal Portion 109a]

Figure 4:
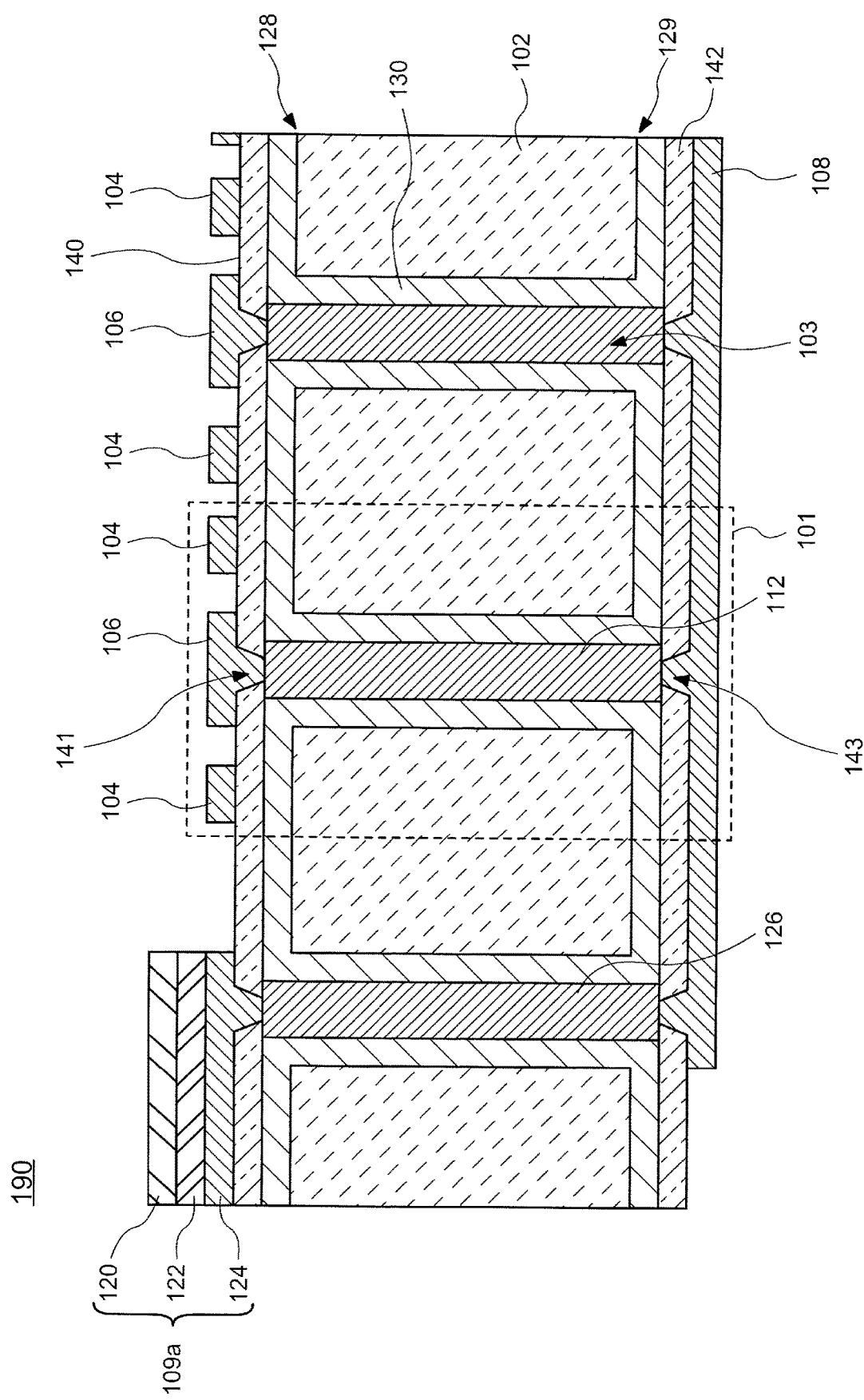
FIG. 4 is a cross-sectional diagram of a part of a detection element along the line A-A' according to one embodiment of the present disclosure.

Next, a planar view and a cross-sectional view of a part of the detection element 190 used in the radiation detection device 100 according to the present disclosure according to the present embodiment are shown in FIG. 3 and FIG. 4 respectively. FIG. 3 is a planar view of the pixel electrode portion 101 and the connection terminal portion 109a, and FIG. 4 is a cross-sectional view of the pixel electrode portion 101 and the connection terminal portion 109a along the line A-A' in FIG. 3.

As is shown in FIG. 3, the cathode electrode 104 and the anode electrode pattern 108 intersect each other. An opening portion 105 is arranged in the cathode electrode 104. The anode electrode 106 is arranged in the opening portion 105. The cathode electrode 104 is spaced apart from the anode electrode 106. That is, the cathode electrode 104 and the anode electrode 106 are insulated. Here, although a structure in which the distance between the cathode electrode 104 and the anode electrode 106 is constant in all directions with respect to the anode electrode 106 is exemplified in FIG. 3, the present invention is not limited to this structure. For example, the distance between the cathode electrode 104 and the anode electrode 106 may be closer in a certain direction with respect to the anode electrode 106 than in other directions. By adopting this structure, it is possible to increase detection sensitivity in the certain direction described above. In addition, although the cathode electrode 104 surrounds the anode electrode 106 in FIG. 3, a part of the cathode electrode 104 may also be opened.

In addition, as described above, the cathode electrode 104 and the anode electrode pattern 108 may be inclined and intersect each other. For example, the anode electrode pattern 108 extends in a substantially horizontal direction with respect to the cathode electrode 104 which extends in a vertical direction, and the anode electrode pattern 108 may be inclined in a horizontal direction at intersection portions between the cathode electrode 104 and the anode electrode pattern 108.

As is shown in FIG. 4, the pixel electrode portion 101 of the detection element 190 includes a substrate 102, an insulating layer 130, a through electrode 112, insulating resin layers 140 and 142, an anode electrode 106 (first electrode), a cathode electrode 104 (second electrode) and an anode electrode pattern 108 (third electrode).

A through hole 103 is arranged in the substrate 102. The insulating layer 130 is arranged inside the through hole 103 and on the front surface (first surface 128) and rear surface (second surface 129) of the substrate 102. The through electrode 112 is arranged inside the through hole 103 more inside than the insulating layer 130 in the through hole 103. Although a structure in which the through electrode 112 is arranged to fill the inside of the through hole 103 is exemplified in FIG. 4, the present invention is not limited to this structure. For example, the through electrode 112 may be arranged only on the side wall of the through hole 103, and a cavity may be arranged inside the through electrode 112. In addition, although a structure in which the insulating layer 130 is formed also on the front surface and the rear surface of the substrate 102 is exemplified in FIG. 4, the present invention is not limited to this structure. For example, the insulating layer 130 may not be formed on the front surface and the rear surface of the substrate 102, and the insulating layer 130 may be formed only on the side wall portion of the through hole 103.

Here, the thickness of the insulating layer 130 in the through hole 103 is 0.1 µm or more and 35 µm or less. Here, it is preferred that the thickness of the insulating layer 130 is 1 µm or more and 30 µm or less. Furthermore, the thickness of the insulating layer 130 described above is more preferably 15 µm or more and 25 µm or less. When the thickness of the insulating layer 130 described above is less than the lower limit described above, a leak current is generated inside the substrate 102, and a voltage sufficient for signal detection can not be applied to the anode electrode 106. In addition, when the thickness of the insulating layer 130 described above exceeds the upper limit, the open end part of the through hole is blocked and the anode can not be formed.

The resin layer 140 is arranged on the front surface side of the substrate 102. In addition, the resin layer 142 is arranged on the rear side of the substrate 102. More specifically, the resin layer 140 and the resin layer 142 are arranged in contact with the insulating layer 130 and the through electrode 112 formed on the front surface side and the rear surface side of the substrate 102 respectively. The resin layer 140 is arranged with an opening portion 141 which is in contact with the through electrode 112 on the front surface side of the substrate 102 and exposes a part of the through electrode 112. The resin layer 142 is arranged with an opening portion 143 which is in contact with the through electrode 112 on the rear surface side of the substrate 102 and exposes a part of the through electrode 112. The anode electrode 106 is arranged above the through electrode 112 and the resin layer 140 and is connected to the through electrode 112 through the opening portion 141.

The cathode electrode 104 is arranged above the resin layer 140 and is spaced apart from the anode electrode 106. Here, the height of the anode electrode 106 arranged above the resin layer 140 and the height of the cathode electrode 104 are substantially the same. The anode electrode pattern 108 is arranged on the rear side of the substrate 102. Specifically, the anode electrode pattern 108 is arranged below the through electrode 112 and the resin layer 142 and is connected to the through electrode 112 through the opening portion 143. The anode electrode pattern 108 connects through electrodes 112 adjacent to each other and is connected to the connection terminal portion 109a through the via 126.

The connection terminal portion 109a has a first metal layer 120, a second metal layer 122 and a third metal layer 124. Here, the first metal layer 120 functions as a connection terminal with an external device. Therefore, it is arranged for the purpose of obtaining a good electrical connection with the connection terminal arranged in an external device. The second metal layer 122 functions as a barrier layer which suppresses diffusion and mixing of respective metal atoms between the first metal layer 120 and the third metal layer 124. Therefore, the second metal layer 122 can be made of a material capable of suppressing the diffusion of a material used for each of the first metal layer 120 and the third metal layer 124. The same material as that of the cathode electrode 104 and the anode electrode 106 can be used for the third metal layer 124. The third metal layer 124 may be formed in the same layer as the cathode electrode 104 and the anode electrode 106, that is, in the same process, and may be formed at approximately the same height as the cathode electrode 104 and the anode electrode 106.

[Materials of Each Member of the Pixel Electrode Portion 101 and the Connection Terminal Portion 109a]

The material of each member included in the pixel electrode portion 101 and the connection terminal portion 109a shown in FIG. 4 is explained in detail.

A silicon substrate can be used as the substrate 102. In addition to the silicon substrate, an insulating substrate such as a glass substrate, a quartz substrate, a sapphire substrate and a resin substrate, and a semiconductor substrate such as a silicon carbide substrate and a compound semiconductor substrate or the like can be used. In addition, these may be stacked. In the case where an insulating substrate is used as the substrate 102, the insulating layer 130 can be omitted.

Although the thickness of the substrate 102 is not particularly limited, for example, a substrate having a thickness of 100 µm or more and 800 µm or less can be used. The thickness of the substrate 102 is more preferably 200 µm or more and 400 µm or less. When the substrate becomes thinner than the lower limit of the thickness of the substrate described above, the deflection of the substrate becomes large. Due to this influence, handling in the manufacturing process becomes difficult, and the substrate warps due to internal stress of a thin film or the like formed on the substrate. In addition, when the substrate is thicker than the upper limit of the thickness of the substrate described above, the process of forming a through hole becomes longer. Due to this influence, the manufacturing process becomes longer and manufacturing costs also increase.

When a silicon substrate is used as the substrate 102, it is possible to use a material having resistivity in the range of 0.01 Ωcm or more and 20000 Ωcm or less. In particular, in order to make it difficult for a parasitic capacitance to be generated between the through electrode 112 to which a high voltage is applied and the substrate 102, it is possible to use a high resistance silicon substrate having a small amount of impurities mixed therein. In the case of using a high resistance silicon substrate, it is possible to use a material having a resistivity in the range of 100 Ωcm or more and 20000 Ωcm or less.

A thermal oxide film (silicon oxide film) can be used as the insulating layer 130. As a thermal oxide film, thermal oxidation may be performed in an oxygen atmosphere to which hydrochloric acid is added in order to reduce the influence of contamination of metals. In addition to the thermal oxide film, an inorganic insulating layer, an organic insulating layer, or a stacked structure of an inorganic insulating layer and an organic insulating layer as described below can be used as the insulating layer 130.

It is possible to use silicon oxide ($SiO_2$), silicon nitride (SiN), aluminum oxide ($Al_2O_3$), aluminum nitride (AlN), silicon carbide (SiC), silicon nitride carbide (SiCN) or silicon oxide doped with carbon (SiCO) or the like can be used as the inorganic insulating layer. These inorganic insulating layers can be formed by a chemical vapor deposition (CVD) method or a physical vapor deposition (PVD) method. A sputtering method, a vacuum evaporation method, an electron beam evaporation method, a plating method, a molecular beam epitaxy method and the like can be used as the PVD method. A thermal CVD method, a plasma CVD method, a catalytic CVD method (Cat (Catalytic)—CVD method or a hot wire CVD method) or the like can be used as the CVD method. Here, the inorganic insulating layers described above may be used as a single layer or may be stacked as the insulating layer 130.

Polyimide, epoxy resin, polyimide resin, benzocyclobutene resin, polyamide, phenol resin, silicone resin, fluororesin, liquid crystal polymer, polyamideimide, polybenzoxazole, cyanate resin, aramid, polyolefin, polyester, BT resin, FR-4, FR-5, polyacetal, polybutylene terephthalate, syndiotactic polystyrene, polyphenylene sulfide, polyether ether ketone, polyether nitrile, polycarbonate, polyphenylene ether polysulfone, polyethersulfone, polyarylate, polyetherimide can be used as the organic insulating layer. In addition, an inorganic filler such as glass, talc, mica, silica, alumina or the like may be used in combination with the above resins. These organic insulating layers can be formed by a coating method or an evaporation method.

For example, copper (Cu) can be used as the through electrode 112. In addition to Cu, it is also possible to use gold (Au), silver (Ag), platinum (Pt), palladium (Pd), rhodium (Rh), tin (Sn), aluminum (Al), nickel (Ni), chromium (Cr) or a material selected from an alloy using any of these metals can be used.

The same material as the organic insulating layers described above can be used as the resin layers 140 and 142. Here, it is possible to use a member which allows gas to easily permeate through as the resin layers 140 and 142. For example, a porous material containing air bubbles may be used.

It is possible to use the same material as the through electrode 112 described above as the cathode electrode 104, the anode electrode 106, the anode electrode pattern 108 and the third metal layer 124. In addition, titanium (Ti), molybdenum (Mo), tungsten (W), tantalum (Ta) and alloys thereof can be used. Here, the cathode electrode 104, the anode electrode 106, and the third metal layer 124 can be formed in the same step (that is, these layers are the same layer). However, a part or all of the cathode electrode 104, the anode electrode 106, and the third metal layer 124 may be formed in different steps.

It is possible to use a material such as Au, Ag, Pt or the like as the first metal layer 120. It is possible to use a material such as Ni, Pd, Ti, Ta, titanium nitride (TiN), tantalum nitride (TaN), or the like as the second metal layer. A material having a diffusion coefficient smaller than that of the first metal layer 120 and the third metal layer 124 can be used as the second metal layer 122. For example, in the case where Au is used for the first metal layer and Cu is used as the third metal layer and the via 126, by using Ni as the second metal layer, when bonding wires are connected to an external circuit on the first metal layer 120, Au of the first metal layer 120 is suppressed from diffusing into the Cu of the third metal layer 124 and the via 126 which inhibits bonding and it has a role of obtaining hardness which is necessary for bonding.

Considering the above, a metal material can be used for the first metal layer 120, the second metal layer 122, the third metal layer 124 and the pixel electrodes (cathode electrode 104 and anode electrode 106) which satisfies the following conditions (1) to (3)

Third metal layer 124=material forming a pixel electrode (1)

Melting point of first metal layer 120<Melting point of third metal layer 124<Melting point of second metal layer 122 (2)

Ionization tendency of the first metal layer 120<Ionization tendency of the third metal layer 124<Ionization tendency of the second metal layer (easily oxidized) (3)

In the present embodiment, Au is used for the first metal layer 120 arranged in the connection terminal portion 109a, and Cu (or copper oxide) having a higher melting point than Au is used for the cathode electrode 104 and the anode electrode 106. The melting point of Au is 1064° C. whereas the melting point of CuO (copper oxide) is 1326° C. In the present embodiment, Cu which configures the cathode electrode 104 and the anode electrode 106 is oxidized by a heat treatment of a sealing resin after wire bonding so that the surfaces of them becomes copper oxide. Therefore, by forming the pixel electrode (cathode electrode 104 and anode electrode 106) with a metal material having a melting point higher than that of the metal material of the first metal layer 120 of the connection terminal portion 109a, it is possible to prevent scattering of metal when a discharge occurs between the cathode electrode 104 and the anode electrode 106. In the present embodiment, it is preferred that the oxide coating thickness of copper oxide is 10 nm or less.

By adopting such a structure, it is possible to prevent scattering of metal due to the occurrence of a discharge during operation of the radiation detection device 100 which applies a high voltage between the cathode electrode 104 and the anode electrode 106, and it is possible to prevent defects such as the cathode electrode 104 and the anode electrode 106 conducting with each other

[Shape of Opening End Part of Resin Layer 140]

Figure 5:
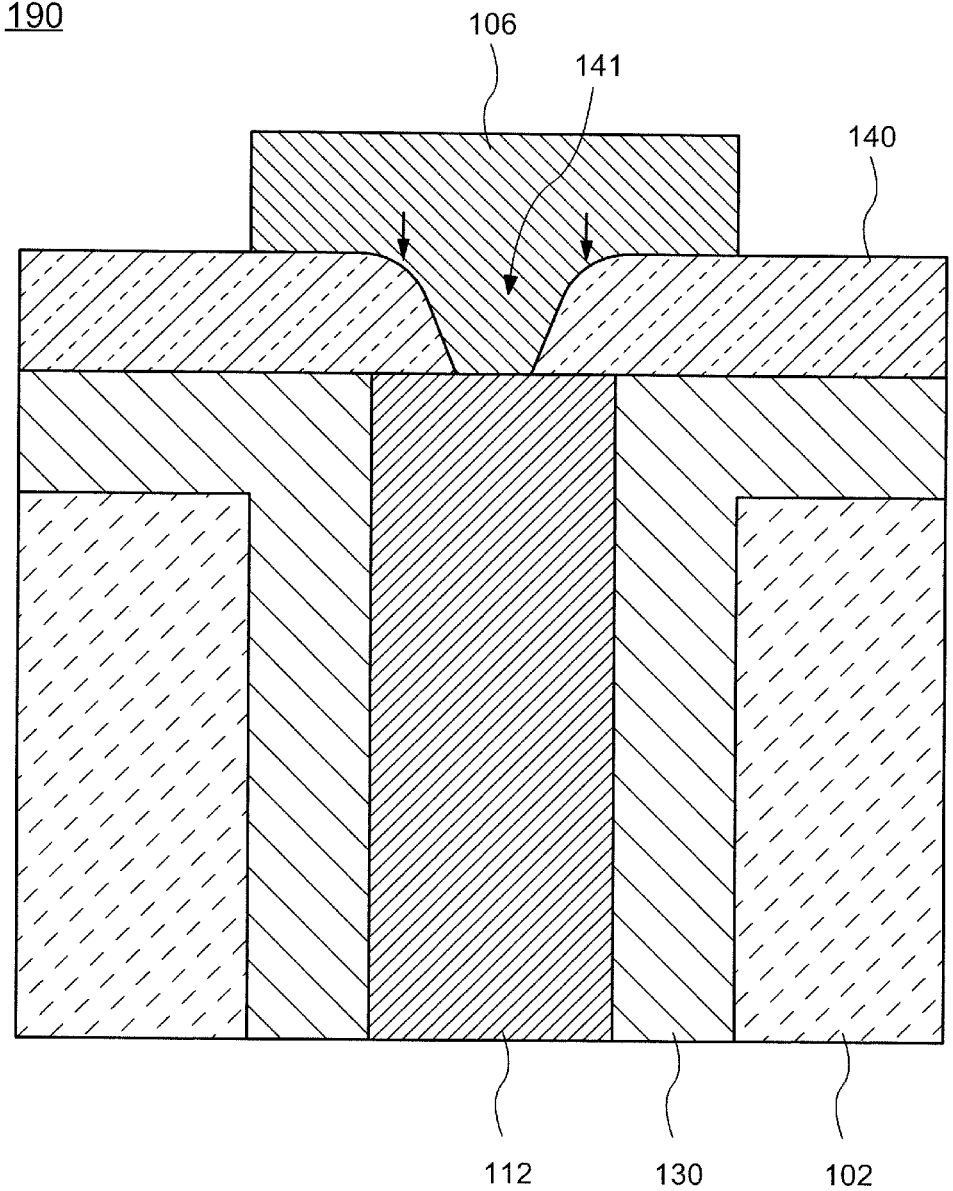
FIG. 5 is an enlarged diagram of a through electrode and an anode electrode in a cross-sectional view of a part of a detection element along the line A-A' according to one embodiment of the present disclosure.

FIG. 5 is an enlarged view of a through electrode and an anode electrode in a cross-sectional view along the line A-A' of a part of a detection element according to one embodiment of the present disclosure. The resin layer 140 shown in FIG. 5 is a cross-sectional shape of the resin layer 140 using a photosensitive resin. In the case of using a photosensitive resin, the shape of the upper end part in the vicinity of the open end part of the resin layer 140 (a region indicated by an arrow in FIG. 5) has a round shape. In addition, the side wall of the resin layer 140 in the opening portion 141 has a tapered shape having a size which increases towards the top.

Here, the size of the opening upper end part of the resin layer 140 means the distance between the parts indicated by the two arrows in FIG. 5 in the opening portion 141 of the resin layer 140. The position indicated by the arrow in FIG. 5 corresponds to the position where the variation rate of the inclination is the highest in the round shape in the vicinity of the open end part of the resin layer 140. That is, in the round shape in the vicinity of the open end, the position where the curvature radius is the smallest is referred to as the opening upper end part of the resin layer 140. Here, the upper end part of the opening can also be referred to as the upper part of the opening portion 141 of the resin layer 140. On the other hand, a part in the vicinity of the open end part of the resin layer 140 which is in contact with the through electrode 112 is referred to as an opening lower end part of the resin layer 140. In the description above, although a photosensitive resin is used as the resin layer 140 and the structure in which the vicinity of the opening end is round is exemplified, the present invention is not limited to this structure. For example, the resin layer 140 may be formed by photolithography and dry etching, and the shape of the upper end part of the opening of the resin layer 140 may not be round.

As is shown in FIG. 5, the opening lower end part of the resin layer 140 is smaller than the size of the through electrode 112. That is, in the region where the through electrode 112 and the resin layer 140 are in contact, the size of the opening portion 141 of the resin layer 140 is smaller than the size of the through electrode 112. Due to this shape, a part of the lower surface of the resin layer 140 is in contact with a part of the upper surface of the through electrode 112. In addition, as shown in FIG. 5, the size of the anode electrode 106 is larger than the size of the opening upper end part of the resin layer 140. In addition, although a structure in which the size of the anode electrode 106 is larger than the size of the through electrode 112 is exemplified in FIG. 5, the present invention is not limited to this structure. For example, the size of the through electrode 112 may be larger than the size of the anode electrode 106.

As described above, according to the radiation detection device of the first embodiment, since the through electrode 112 is in contact with the resin layer 140, hydrogen and moisture generated at the interface between the insulating layer 130 and the through electrode 112 are discharged to the exterior through the resin layer 140 and 142. As a result, it is possible to suppress breakage of the through hole 103 and the through electrode 112. In addition, by arranging the anode electrode 106 in a shape which protrudes above the resin layer 140, it is possible to obtain a sufficient electric field and suppress disorder of the electric field.

In addition, since the opening size of the opening portion 141 is smaller than the size of the through electrode 112 in the region where the through electrode 112 and the resin layer 140 are in contact, and the resin layer 140 is arranged along the outer periphery of the through electrode 112, it is possible to efficiently discharge hydrogen and moisture generated at the interface between the insulating layer 130 and the through electrode 112 to the exterior. In addition, since the thickness of the insulating layer 130 in the through hole 103 is 0.1 μm or more and 35 μm or less, it is possible to suppress the occurrence of parasitic capacitance between the through electrode 112 and the substrate 102, and it is difficult for an electric field to be formed within the substrate 102. In this way, since the electric field tends to concentrate in the vicinity of the pixel electrode portion 101, the effect of being able to improve an amplification ratio can be obtained. This effect is more prominent when the thickness of the insulating layer 130 in the through hole 103 is 1 μm or more and 30 μm or less and is even more prominent when the thickness of the insulating layer 130 is 15 μm or more and 25 μm or less. In addition, since the size of the anode electrode 106 is larger than the size of the opening upper end part of the resin layer 140, the shape of the upper end part of the anode electrode 106 can be easily controlled. For example, it is possible to sharpen the upper end part of the anode electrode 106 in order to further concentrate an electric field in the vicinity of the anode electrode 106.

[Method of Manufacturing Detection Element]

A method of manufacturing a detection element according to the first embodiment of the present disclosure is explained while referring to FIG. 6 to FIG. 15. In FIG. 6 to FIG. 15, the same reference numerals are given to the same elements as those shown in FIG. 4. Here, a manufacturing method for manufacturing a detection element using a silicon substrate is explained.

FIG. 6 is a diagram showing a process of forming a through hole in a substrate in the method of manufacturing a detection element according to one embodiment of the present disclosure. As a method for forming the through hole 103 in the substrate 102, it is possible to use a method such as wet etching or dry etching using photolithography, sublimation or ablation by laser irradiation, formation of a deteriorated layer by laser irradiation and wet etching or a sandblasting method.

Figure 7:
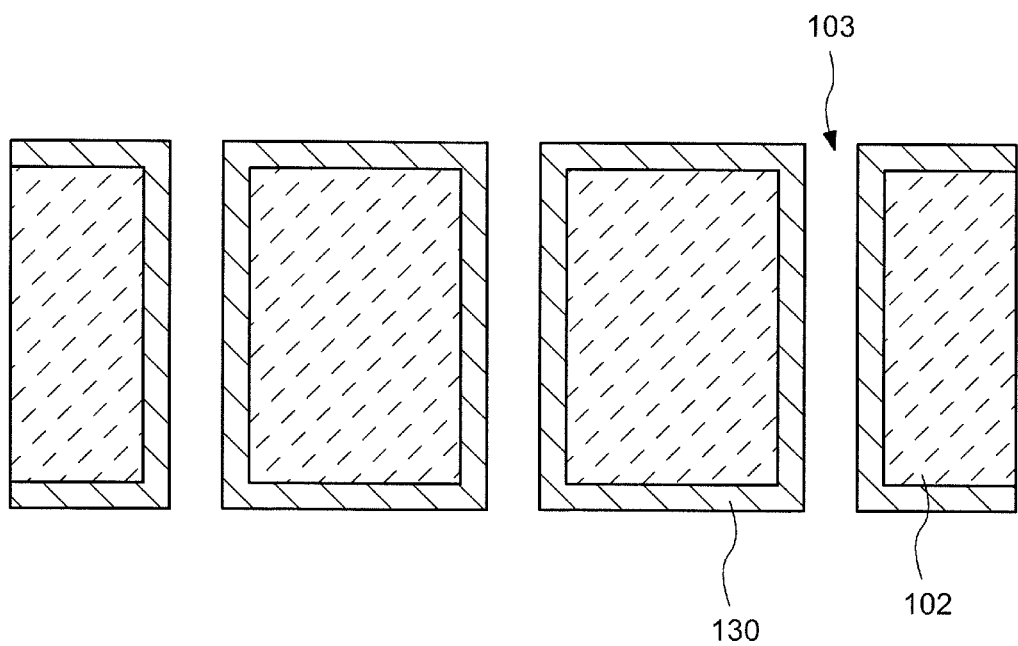
FIG. 7 is a diagram showing a process of forming an insulating layer on a substrate and in a through hole in the method of manufacturing a detection element according to one embodiment of the present disclosure.

FIG. 7 is a diagram showing a process of forming an insulating layer on a substrate and in a through hole in the method of manufacturing a detection element according to one embodiment of the present disclosure. As is shown in FIG. 7, the insulating layer 130 is formed on the substrate 102 in which the through hole 103 is formed. The insulating layer 130 may be formed at least inside the through hole 103, and it is not necessarily required to be formed on the front surface or the rear surface of the substrate 102. When a silicon substrate is used as the substrate 102, the insulating layer 130 can be obtained by thermal oxidation of the substrate 102. Thermal oxidation of the substrate 102 is performed by a heat treatment in an oxygen gas atmosphere, or a heat treatment performed in an atmosphere in which chlorine is added to oxygen gas.

The insulating layer 130 can be formed by a CVD method in addition to the thermal oxidation described above. In the case where the insulating layer 130 is formed by a CVD method, a film forming method which can also form the insulating layer 130 with good coverage in the through hole 103 is preferred. For example, the insulating layer 130 can be formed by a LP-CVD (Low Pressure CVD) method which is one of the thermal CVD methods. In the LP-CVD method, since the average free path of gas molecules is long, gas molecules easily diffuse. Therefore, the insulating layer 130 is formed with good coverage. Alternatively, a bottomed hole is formed in the substrate, an insulating layer is formed inside the bottomed hole, the substrate is thinned from the bottom side of the bottomed hole to the bottom of the bottomed hole, and an insulation layer may be formed from the thinned rear surface side.

Figure 8:
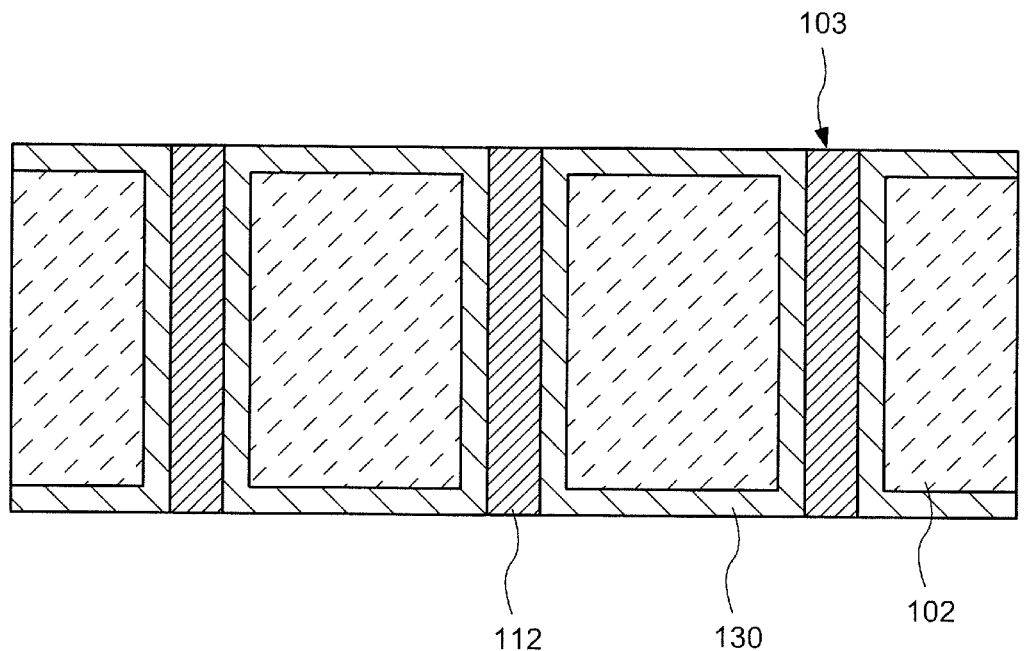
FIG. 8 is a diagram showing a process of filling a through electrode in a through hole in a manufacturing method of a detection element according to one embodiment of the present disclosure.

FIG. 8 is a diagram showing a process of filling a through electrode in a through hole in a method for manufacturing a detection element according to one embodiment of the present disclosure. As is shown in FIG. 8, the through electrode 112 is filled in the through hole 103. It is possible to use an electrolytic plating method or an electroless plating method for filling the through electrode 112. Although a detailed explanation is omitted here, a seed layer is formed at one open end part of the through hole 103, a plating layer is grown on the seed layer, and a plating layer is grown until one open end part of the through hole 103 is closed. In other words, a lid plating is formed. Next, by growing a plating layer from the lid plating toward the other open end part of the through hole 103, it is possible to form the through electrode 112 which is filled into the through hole 103.

Figure 9:
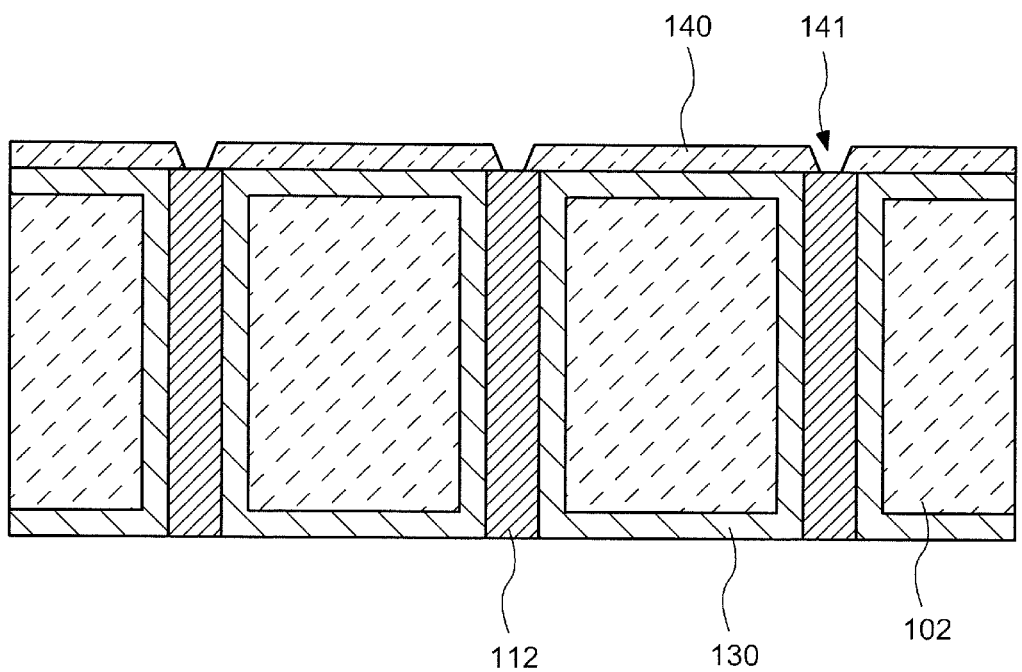
FIG. 9 is a diagram showing a process of forming an insulating resin layer on a surface of a substrate in the method for manufacturing a detection element according to one embodiment of the present disclosure.

FIG. 9 is a diagram showing a process of forming an insulating resin layer on the surface of a substrate in the method for manufacturing a detection element according to one embodiment of the present disclosure. As is shown in FIG. 9, a resin layer 140 arranged with opening portions 141 is formed on the insulating layer 130 and the through electrodes 112 on the surface side of the substrate 102. Here, the resin layer 140 is formed on the entire surface of the substrate 102 so as to cover the insulating layer 130 and the through electrode 112, and the opening portion 141 is arranged at a position where a part of the through electrode 112 is exposed. The opening portion 141 is formed in a tapered shape with the inclined surface facing upward. For example, the resin layer 140 can be formed by a coating method. In addition, the resin layer 140 may be formed by a single layer or stacked layers.

Figure 10:
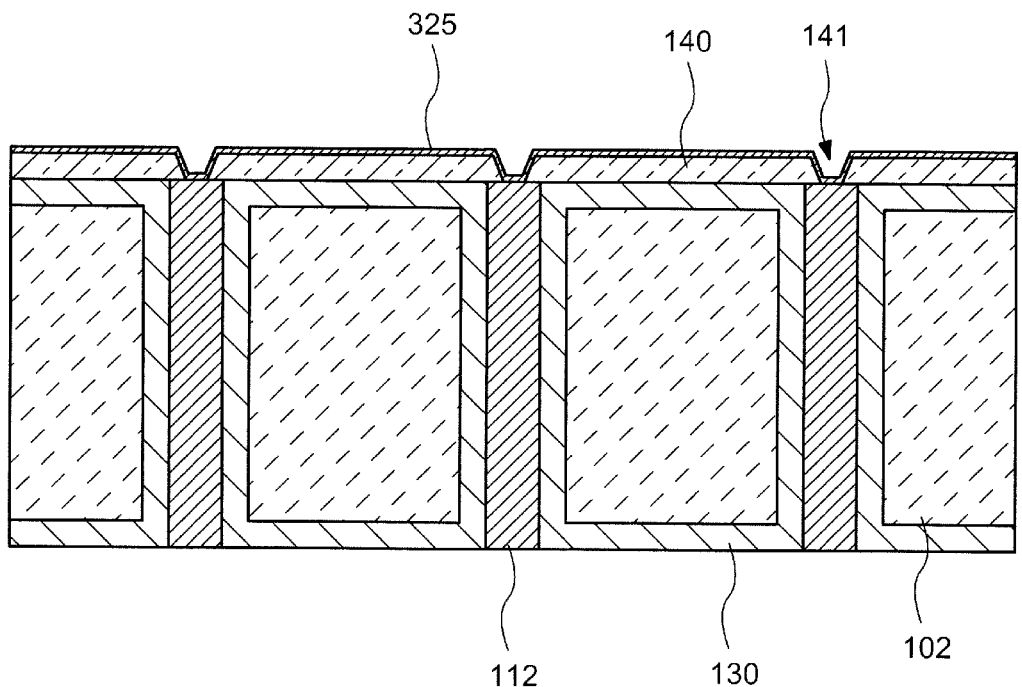
FIG. 10 is a diagram showing a process of forming a seed layer on a resin layer and a through electrode in a method of manufacturing a detection element according to one embodiment of the present disclosure.

FIG. 10 is a diagram showing a process of forming a seed layer on a resin layer and a through electrode in the method for manufacturing a detection element according to one embodiment of the present disclosure. As is shown in FIG. 10, the seed layer 325 which becomes a part of the cathode electrode 104, the anode electrode 106 and the third metal layer 124 are formed on the resin layer 140 and the through electrode 112 exposed at the bottom of the opening portion 141. The seed layer 325 can be formed by a PVD method or a CVD method and the like. The same material as the plating layer 326 to be formed later on the seed layer 325 can be selected as the material used for the seed layer 325. The seed layer 325 is used as a seed in an electrolytic plating method when forming the plating layer 326 in a later process. Here, the seed layer 325 is preferably formed with a film thickness of 20 nm or more and 1 µm or less. In addition, the seed layer 325 is more preferably formed with a film thickness of 100 nm or more and 300 nm or less.

Figure 11:
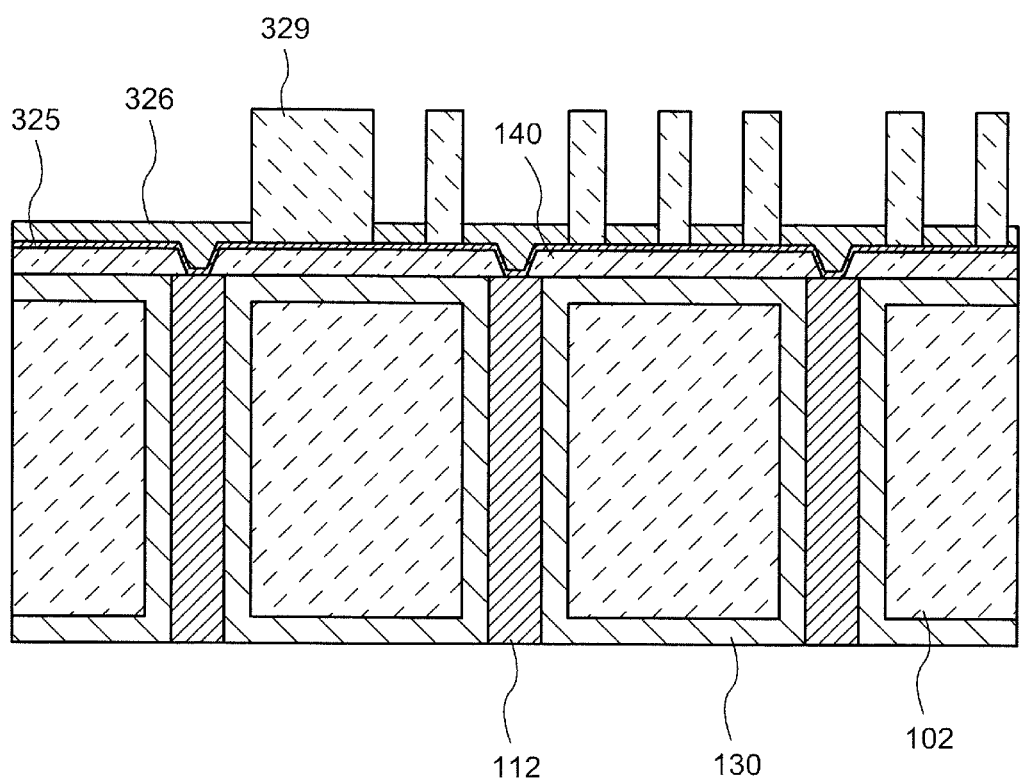
FIG. 11 is a diagram showing a process of forming a resist on a seed layer and forming a plating layer in a region exposed from the resist in the method of manufacturing a detection element according to one embodiment of the present disclosure.

FIG. 11 is a diagram showing a process of forming a resist on a seed layer and forming a plating layer in a region exposed from the resist in the method for manufacturing a detection element according to one embodiment of the present disclosure. As is shown in FIG. 11, after coating a photoresist on the seed layer 325, exposure and development are performed to form a resist pattern 329, an electrolytic plating method is performed to pass a current through the seed layer 325, and a plating layer 326 is formed in a region where the patterns of the cathode electrode 104, the anode electrode 106, and the third metal layer 124 shown in FIG. 4 are formed above the seed layer 325 exposed from the resist pattern 329.

Figure 12:
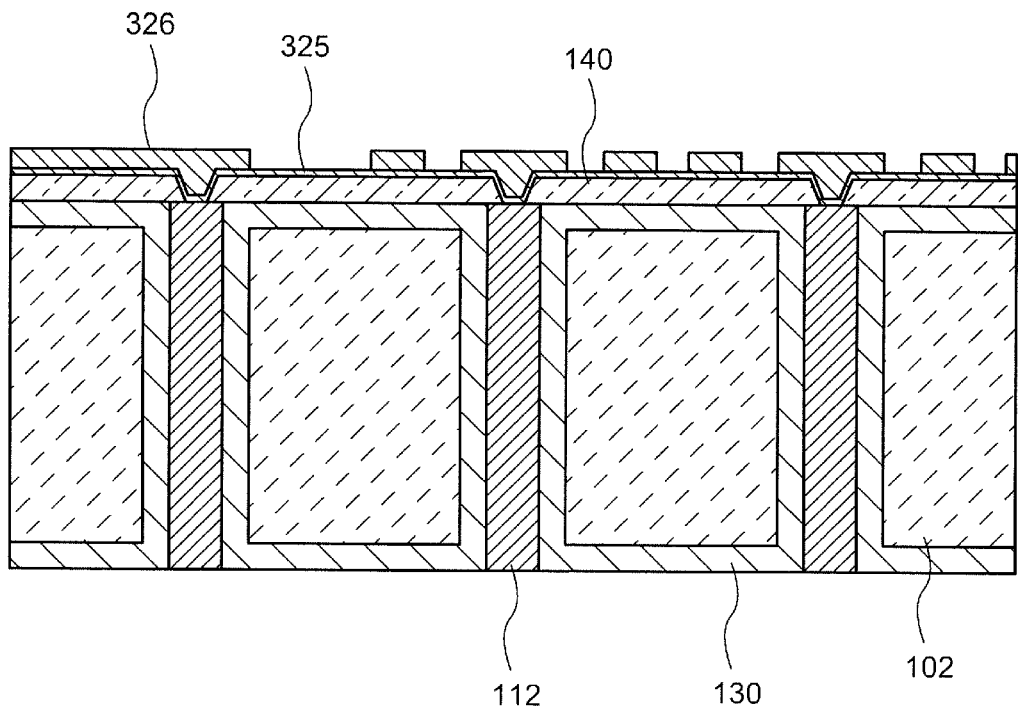
FIG. 12 is a diagram showing a process of removing a resist in a method of manufacturing a detection element according to one embodiment of the present disclosure.

FIG. 12 is a diagram showing a process of removing a resist in the method for manufacturing a detection element according to one embodiment of the present disclosure. As is shown in FIG. 12, after forming the plating layer 326, a photoresist forming the resist pattern 329 is removed using an organic solvent. Furthermore, in order to remove the photoresist, it is possible to use ashing by an oxygen plasma instead of using an organic solvent.

Figure 13:
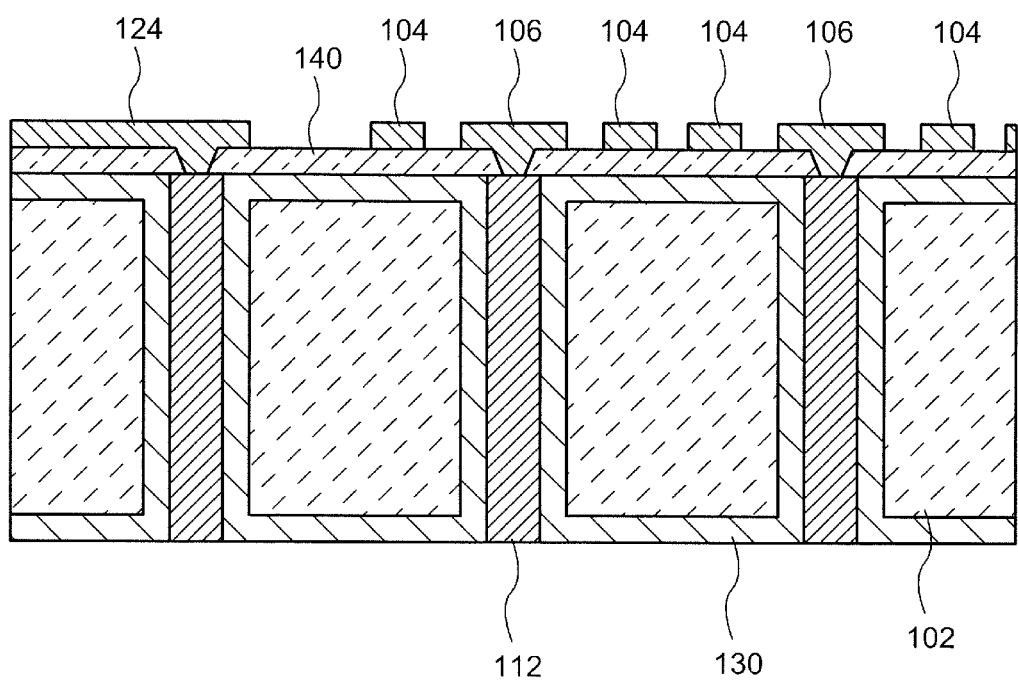
FIG. 13 is a diagram showing a process of forming an anode electrode and a cathode electrode in a method of manufacturing a detection element according to one embodiment of the present disclosure.

FIG. 13 is a diagram showing a process of forming an anode electrode and a cathode electrode in the method for manufacturing a detection element according to one embodiment of the present disclosure. As is shown in FIG. 13, by removing (etching) the seed layer 325 in a region covered with the resist pattern 329 and in which the plating layer 326 is not formed, the cathode electrode 104, the anode electrode 106, and the third metal layer 124 are electrically separated from each other. Since the surface of the plating layer 326 is also etched and thinned by etching of the seed layer 325, it is preferred to set the film thickness of the plating layer 326 while considering the effect of this thinning. Wet etching or dry etching can be used as the etching in this step. Through this process, the cathode electrode 104, the anode electrode 106, and the third metal layer 124 shown in FIG. 4 can be formed. Furthermore, although the cathode electrode 104, the anode electrode 106 and the third metal layer 124 are formed as two layers of the seed layer 325 and the plating layer 326, the structure formed as one body in FIG. 13 is exemplified.

Figure 14:
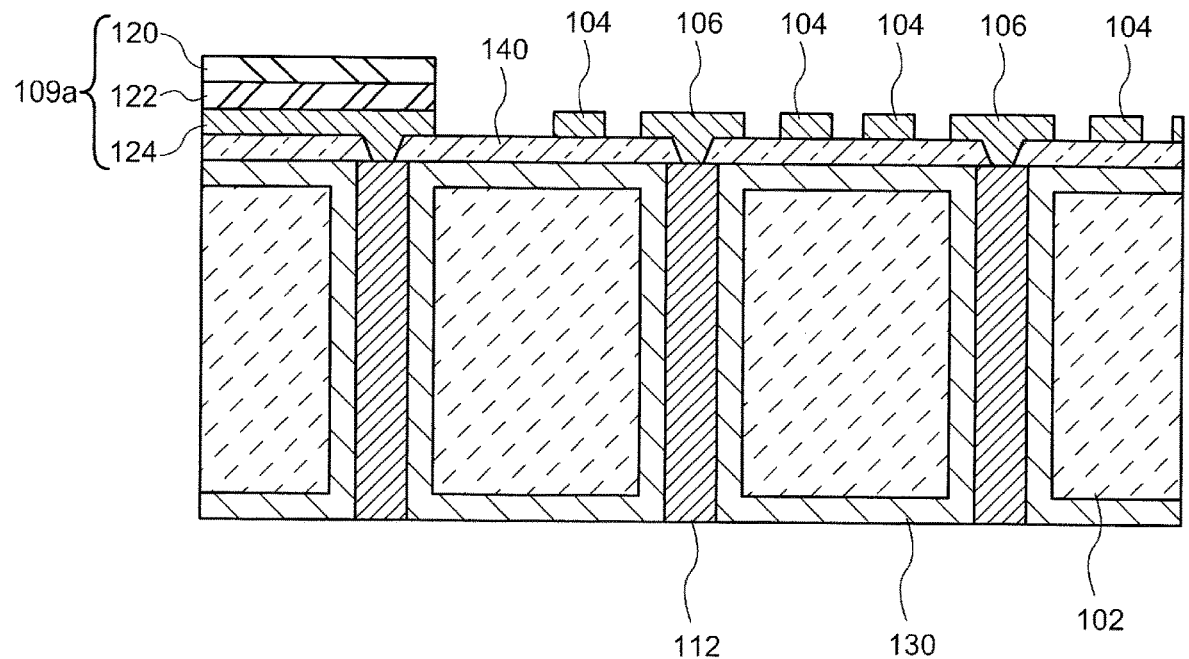
FIG. 14 is a diagram showing a process of forming a wiring terminal portion in a method of manufacturing a detection element according to one embodiment of the present disclosure.

FIG. 14 is a diagram showing a process of forming a wiring terminal portion in the method for manufacturing a detection element according to one embodiment of the present disclosure. As is shown in FIG. 14, the second metal layer 122 and the first metal layer 120 are formed on the third metal layer 124 to form the connection terminal portion 109a. The second metal layer 122 and the first metal layer 120 can be selectively formed on the third metal layer 124 by an electrolytic plating method which conducts the third metal layer 124. However, a metal layer for forming the second metal layer 122 and the first metal layer 120 may be formed over the entire surface, a region corresponding to the connection terminal portion 109a may be covered with a photoresist, and the other regions may be etched to form the second metal layer 122 and the first metal layer 120.

Figure 15:
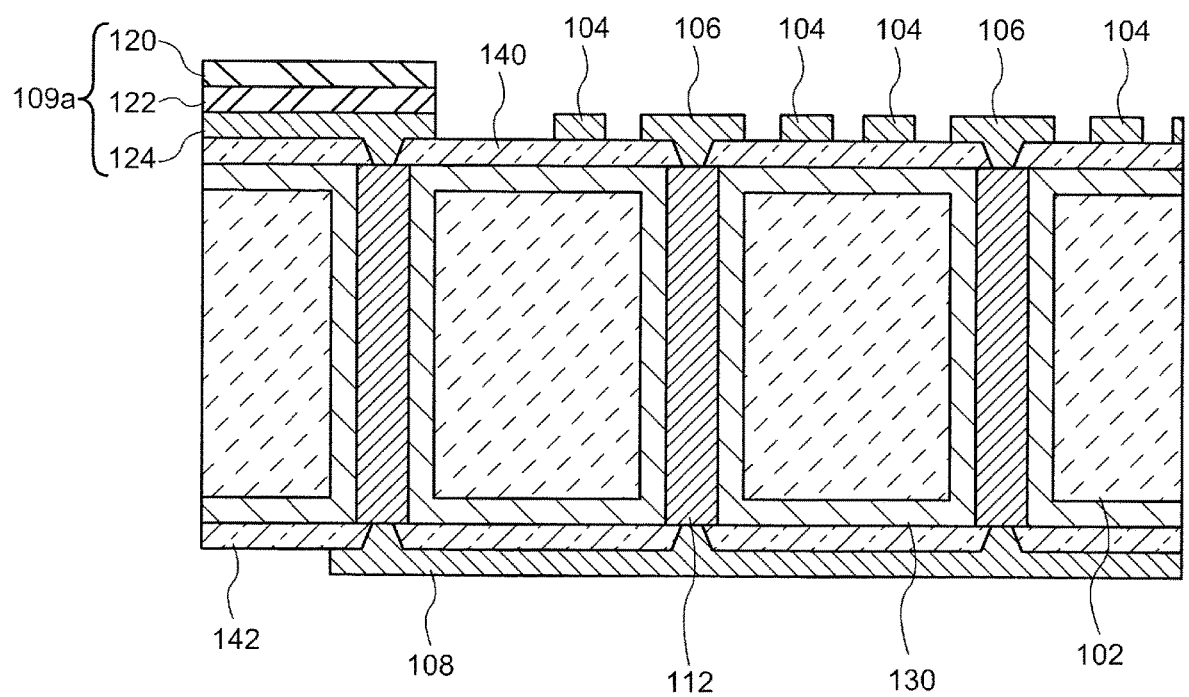
FIG. 15 is a diagram showing a process of forming an anode electrode pattern on the rear surface of a substrate in the method for manufacturing a detection element according to one embodiment of the present disclosure.

FIG. 15 is a diagram showing a process of forming an anode electrode pattern on the rear surface of a substrate in the method for manufacturing a detection element according to one embodiment of the present disclosure. As is shown in FIG. 15, the resin layer 142 and the anode electrode pattern 108 are formed on the rear side of the substrate 102 by the same method as that shown in FIG. 9 to FIG. 13. By the manufacturing method described above, it is possible to obtain the structure of the radiation detection device 100 shown in FIG. 4.

Figure 16:
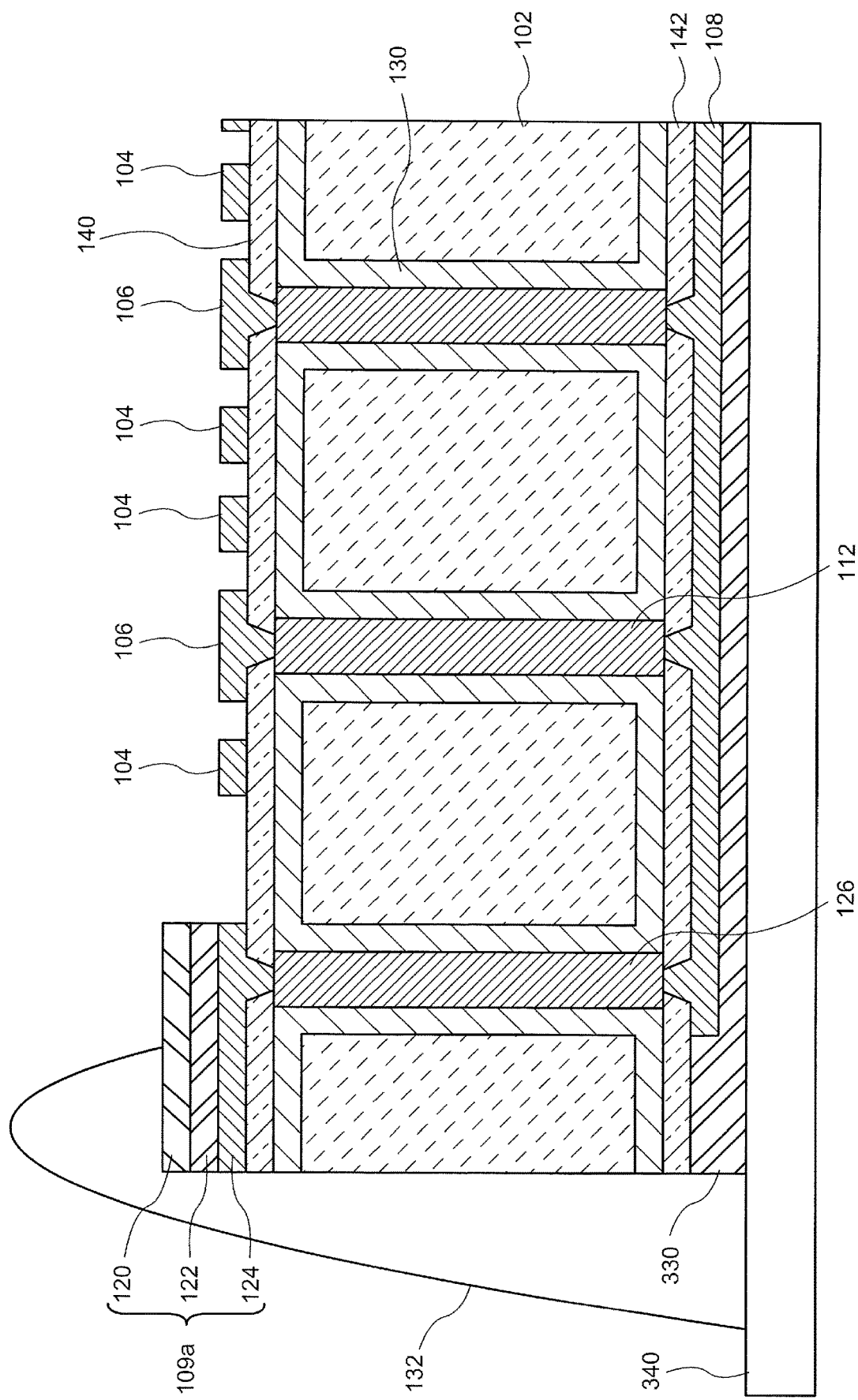
FIG. 16 is a diagram showing a wire bonding process in the method for manufacturing a detection element according to one embodiment of the present disclosure.

FIG. 16 is a diagram showing a wire bonding process in the method of manufacturing a detection element according to one embodiment of the present disclosure. As is shown in FIG. 16, the detection element 190 of FIG. 15 is fixed to a frame 340 via an adhesive layer 330, and the first metal layer 120 and the frame 340 are connected by a bonding wire 132.

Second Embodiment

Figure 17:
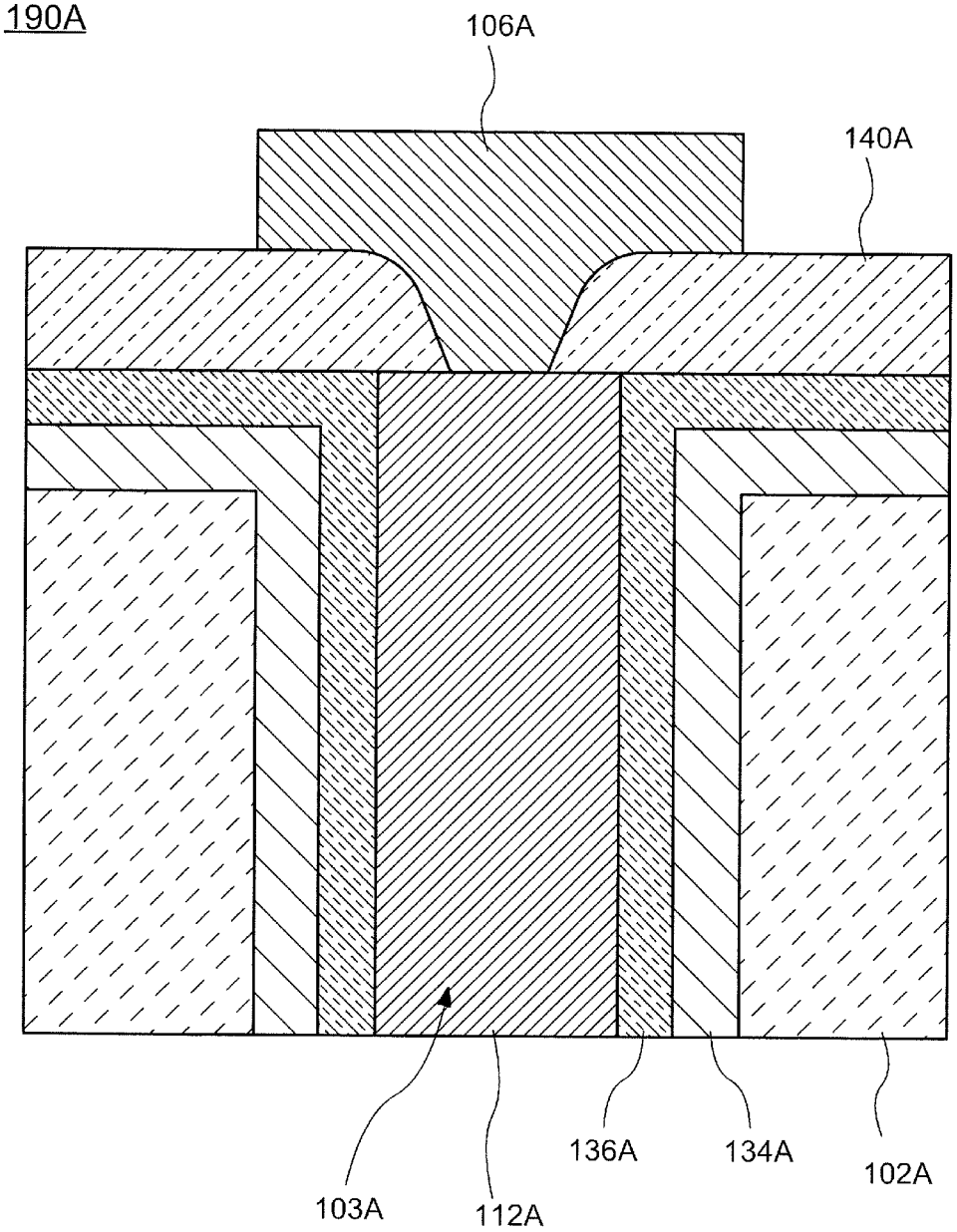
FIG. 17 is an enlarged diagram of a through electrode and an anode electrode in a cross-sectional view of a part of a detection element according to one embodiment of the present disclosure.

The structure of the detection element according to the second embodiment of the present disclosure is explained in detail while referring to FIG. 17. In the detection element 190A used in the radiation detection device 100A according to the second embodiment, the same reference numerals are given to the same portions or portions having similar functions as those of the detection element 190 shown in FIG. 5 and an explanation thereof is omitted.

FIG. 17 is an enlarged diagram of a through electrode and an anode electrode in a cross-sectional view of a part of a detection element according to an embodiment of the present disclosure. Although the detection element 190A of the radiation detection device 100A shown in FIG. 17 is similar to the detection element 190 of the radiation detection device 100 shown in FIG. 5, the detection element 190A of the radiation detection device 100A is different in that a first insulating layer 134A and a second insulating layer 136A are arranged between a substrate 102A and a through electrode 112A. Here, the first insulating layer 134A is arranged inside the through hole 103A, and the second insulating layer 136A is arranged further inside the through hole 103A than the first insulating layer 134A.

A material having a lower dielectric constant than that of the second insulating layer 136A can be used for the first insulating layer 134A. In addition, the first insulating layer 134A is formed thicker than the second insulating layer 136A. A material having a smaller diffusion coefficient of atoms contained in the material of the through electrode 112A compared to the first insulating layer 134A can be used for the second insulating layer 136A. For example, a silicon oxide layer can be used as the first insulating layer 134A. For example, a silicon nitride layer can be used as the second insulating layer 136A. The thickness of the first insulating layer 134A can be set to 10 nm or more and 35 µm or less. In addition, the thickness of the second insulating layer 136A can be set to 10 nm or more and 10 µm or less.

As described above, by arranging the first insulating layer 134A and the second insulating layer 136A between the substrate 102A and the through electrode 112A, it is possible to suppress the diffusion of atoms contained in the material of the through electrode 112A to the substrate 102A while suppressing a parasitic capacitance between the through electrode 112A and the substrate 102A. As a result, it is possible to suppress the occurrence of a leakage current from the through electrode 112A to the substrate 102A due to atoms diffused from the through electrode 112.

Third Embodiment

Figure 18:
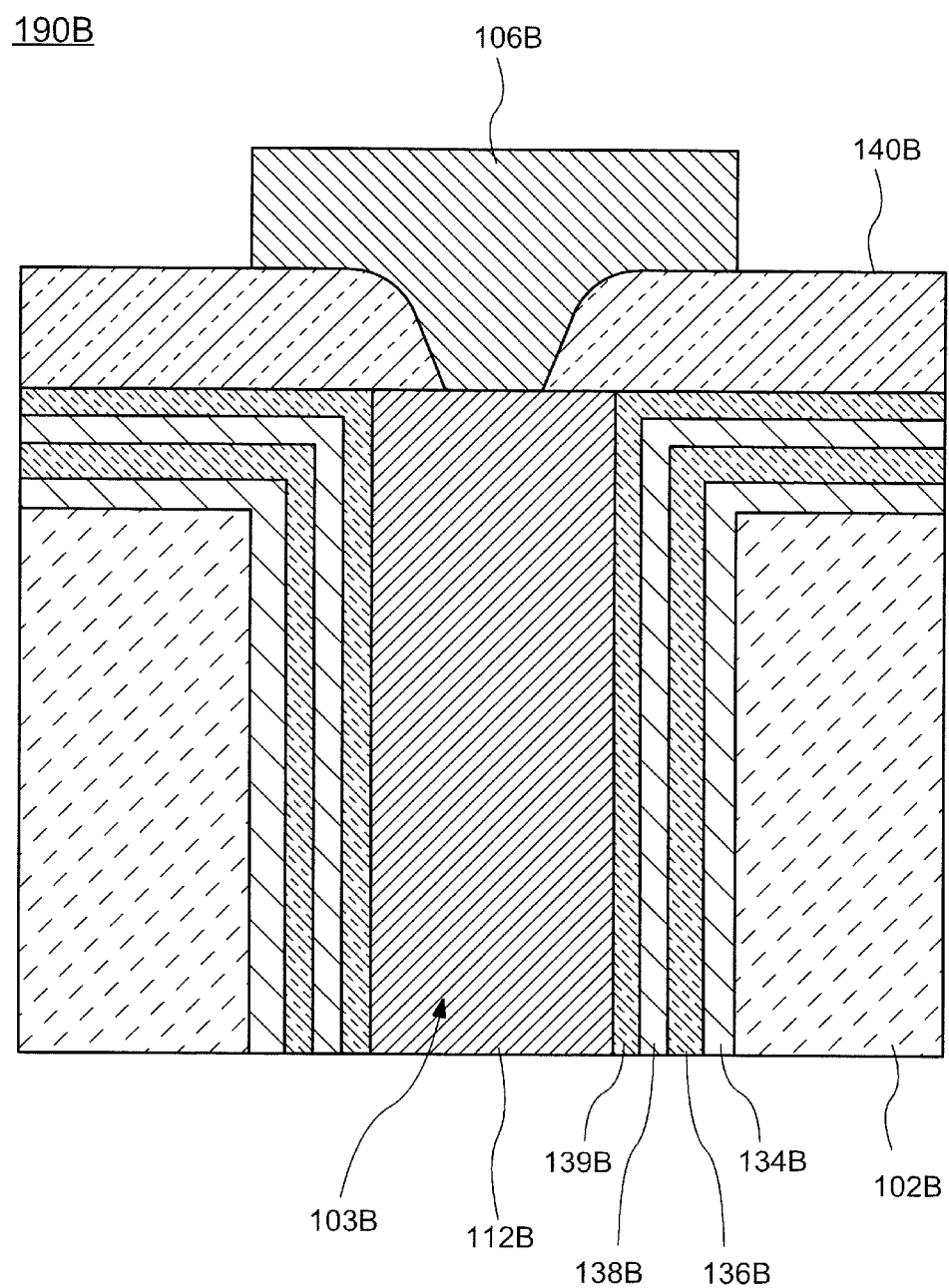
FIG. 18 is an enlarged diagram of a through electrode and an anode electrode in a cross-sectional view of a part of a detection element according to one embodiment of the present disclosure.

The structure of the detection element according to the third embodiment of the present disclosure is explained in detail while referring to FIG. 18. In the detection element 190B used in the radiation detection device 100 B according to the third embodiment, the same reference numerals are given to the same portions or portions having similar functions as those of the detection element 190 shown in FIG. 5 and an explanation thereof is omitted.

FIG. 18 is an enlarged diagram of a through electrode and an anode electrode in a cross-sectional view of a part of a detection element according to one embodiment of the present disclosure. Although the detection element 190B of the radiation detection device 100B shown in FIG. 18 is similar to the detection element 190 of the radiation detection device 100 shown in FIG. 5, it is different in that the detection element 190B of the radiation detection device 100B is arranged with a first insulating layer 134B, second insulating layer 136B, third insulating layer 138B and fourth insulating layer 139B between the substrate 102B and the through electrode 112B. Here, the first insulating layer 134B is arranged inside the through hole 103B, the second insulating layer 136B is arranged further inside the through hole 103B than the first insulating layer 134B, the third insulating layer 138B is arranged further inside the through hole 103B than the second insulating layer 136B and the fourth insulating layer 139B is arranged further inside the through hole 103B than the third insulating layer 138B.

It is possible to use an insulating layer having compressive stress as the first insulating layer 134B and the third insulating layer 138B. On the other hand, it is possible to use an insulating layer having a tensile stress as the second insulating layer 136B and the fourth insulating layer 139B. That is, in the detection element 190B shown in FIG. 18, a plurality of layers having tensile stress and a plurality of layers having compression stress are alternately stacked in the through hole 103B.

Here, the film thickness described above is preferably adjusted so that the difference between the compression stress (which is caused by the first insulating layer 134B and the third insulating layer 138B) and the tensile stress (which is caused by the second insulating layer 136B and the fourth insulating layer 139B) becomes 25 MPa or less. In addition, although a structure is shown in FIG. 18 in which the number of layers having the tensile stress (the second insulating layer 136B and the fourth insulating layer 139B) and the number of layers having compressive stress (the first insulating layer 134B and the third insulating layer 138B) is the same, the present invention is not limited to this structure. For example, the number of layers having tensile stress and the number of layers having compressive stress may be different.

As described above, the plurality of layers having the tensile stress and the plurality of layers having the compressive stress are alternately stacked in the through hole 103B so that warpage of the substrate 102B can be suppressed.

Fourth Embodiment

Figure 19:
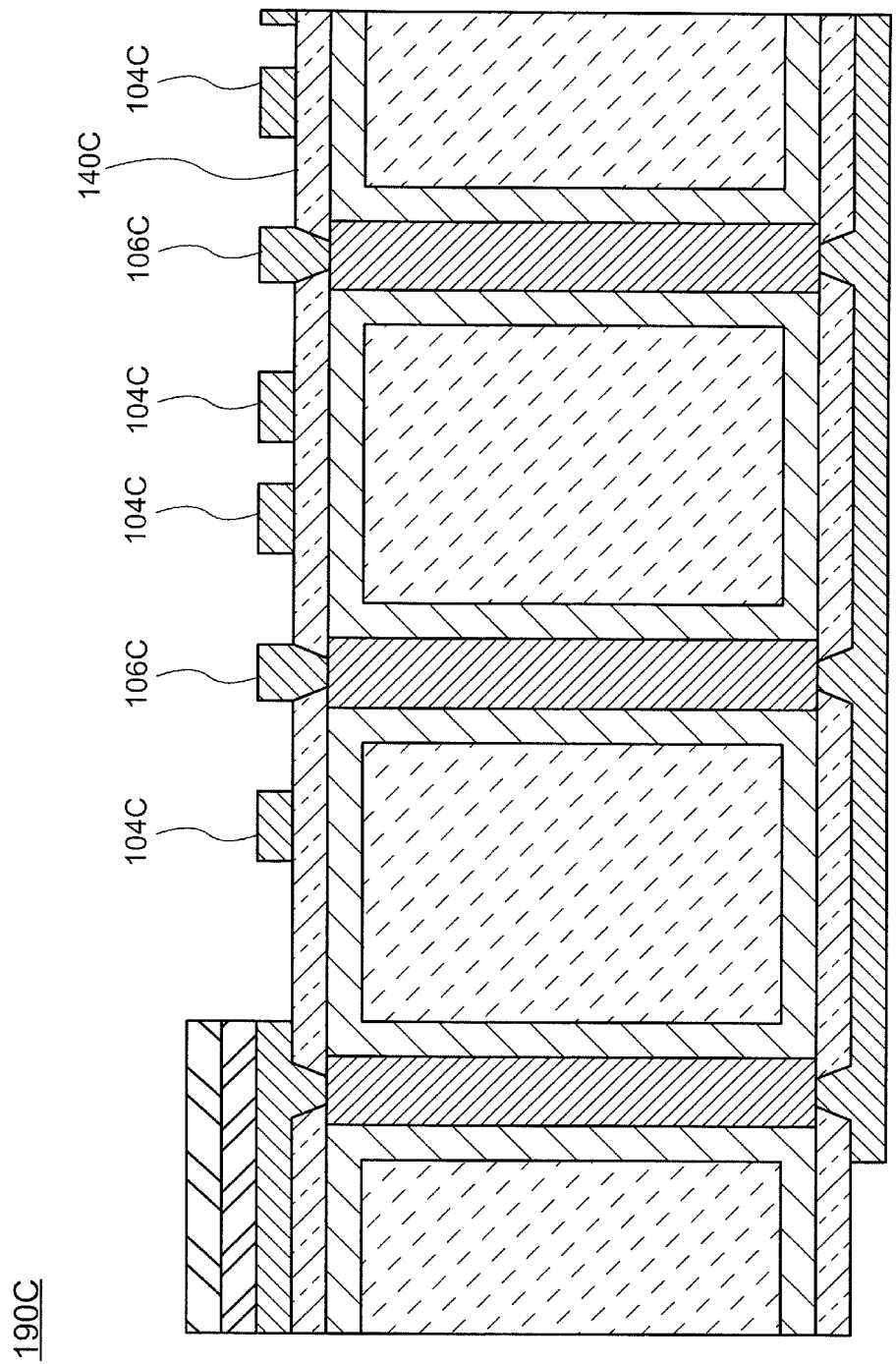
FIG. 19 is a cross-sectional diagram of a part of a detection element according to one embodiment of the present disclosure.

The structure of the detection element according to the fourth embodiment of the present disclosure is explained in detail while referring to FIG. 19. In the detection element 190C used in the radiation detection device 100C according to the fourth embodiment, the same reference numerals are given to the same portions or portions having similar functions as those of the detection element 190 shown in FIG. 4 and an explanation thereof is omitted.

FIG. 19 is a cross-sectional diagram of a part of a detection element according to one embodiment of the present disclosure. Although the detection element 190C of the radiation detection device 100C shown in FIG. 19 is similar to the detection element 190 of the radiation detection device 100 shown in FIG. 4, it is different in that it has a structure in which the size of the anode electrode 106C is substantially the same as the size of the opening upper end part of the insulating layer 140C.

As described above, since the size of the anode electrode 106C is substantially the same as the size of the opening upper end part of the insulating layer 140C, the surface area of the anode electrode 106C can be reduced and a higher electric field can be generated.

Fifth Embodiment

A structure of a detection element according to a fifth embodiment of the present disclosure is explained in detail while referring to FIG. 20. In the detection element 190D used in the radiation detection device 100D according to the fifth embodiment, the same reference numerals are given to the same portions or portions having similar functions as those of the detection element 190 shown in FIG. 4 and an explanation thereof is omitted.

FIG. 20 is a cross-sectional diagram of a part of a detection element according to one embodiment of the present disclosure. Although the detection element 190D of the radiation detection device 100D shown in FIG. 20 is similar to the detection element 190 of the radiation detection device 100 shown in FIG. 4, it is different in that it has an anode electrode formed by a first anode electrode 160D and a second anode electrode 162D, and the size of the second anode electrode 162D is smaller than the size of the opening upper end part of the insulating layer 140D. In FIG. 20, although the anode electrode is formed by different layers such as the first anode electrode 160D and the second anode electrode 162D, as in the detection element of the radiation detection device 100, the first anode electrode 160D and the second anode electrode 162D may be formed by the same layer. In other words, the first anode electrode 160 D and the second anode electrode 162D may be formed of the same continuous material.

The first anode electrode 160D and the second anode electrode 162D shown in FIG. 20 are formed by filling the first anode electrode 160D in the opening portion 141 arranged in the resin layer 140, performing a surface treatment so that the surface of the resin layer 140 and the surface of the first anode electrode 160D are on the same plane, and forming the second anode electrode 162D thereon.

As described above, since the size of the anode electrode 106D is smaller than the size of the opening upper end part of the insulating layer 140D, the upper end part of the first anode electrode 160D and the upper end part of the second anode electrode 162D have an edge (corner part), therefore it is possible to suppress parasitic capacitance between the through electrode 112 and the substrate 102 which makes it difficult for an electric field to be formed inside the substrate 102. In this way, an electric field tends to concentrate in the vicinity of a pixel electrode portion 101 so that the amplification ratio can be improved.

Sixth Embodiment

A structure of a detection element according to a sixth embodiment of the present disclosure is explained in detail while referring to FIG. 21A to FIG. 26B. In the detection element 190E used in the radiation detection device 100E according to the sixth embodiment, the same reference numerals are given to the same portions or portions having similar functions as those of the detection element 190 shown in FIG. 5 and an explanation thereof is omitted.

Figure 21A:
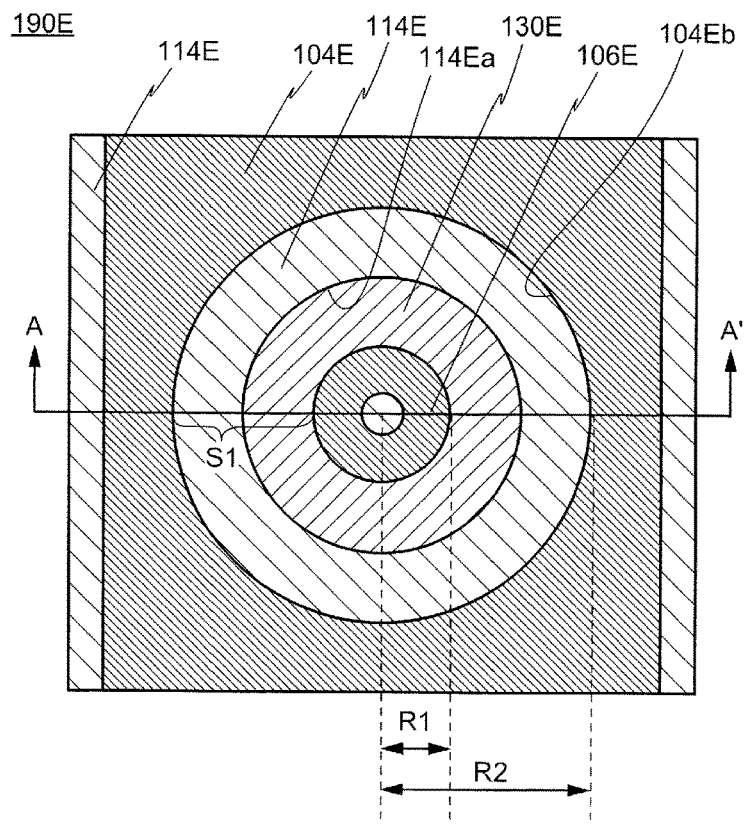
FIG. 21A is a planar diagram of a part of a detection element according to one embodiment of the present disclosure.
Figure 21B:
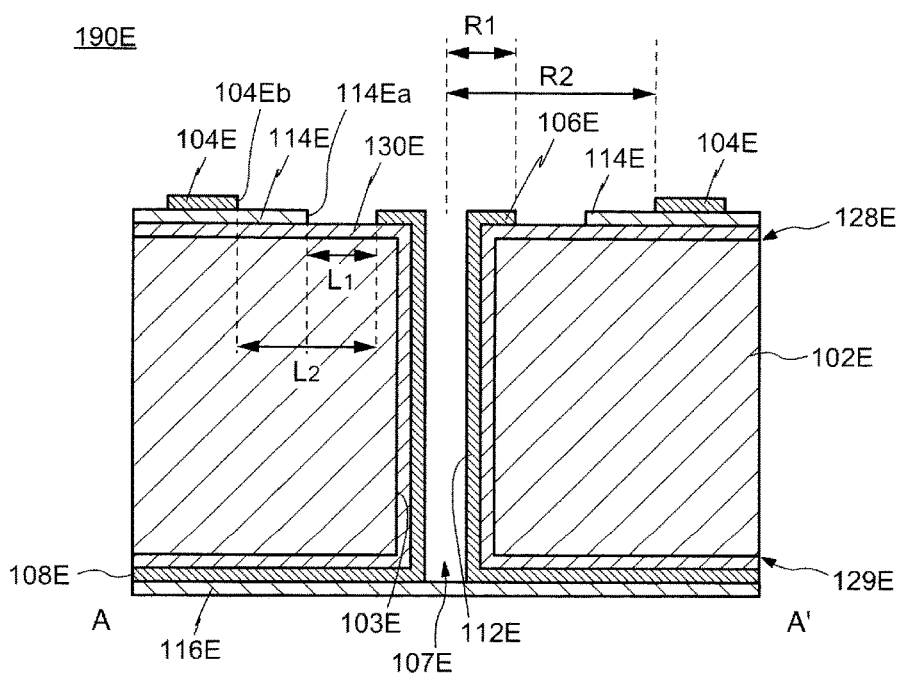
FIG. 21B is a cross-sectional diagram of a part of a detection element according to one embodiment of the present disclosure.

FIG. 21A and FIG. 21B are a planar diagram and a cross-sectional diagram of a part of a detection element according to one embodiment of the present disclosure. FIG. 21A is a planar diagram of the detection element 190E. FIG. 21B is a cross-sectional diagram of the detection element 190E along the line A-A' of FIG. 21A.

As is shown in FIG. 21A and FIG. 21B, the detection element 190E includes a substrate 102E, an insulating layer 130E, a through electrode 112E, a cathode electrode 104E, an anode electrode 106E, a first insulating resin layer 114E, an anode electrode pattern 108E and a second insulating resin layer 116E.

The substrate 102E is arranged with a through hole 103E. In the present embodiment, the size of the through hole 103E is 50 μm. A Si substrate is used as the substrate 102E. The thickness of the Si substrate is preferably about 400 μm. It is preferred that the resistance of the Si substrate is higher. It is preferred that the Si substrate is about 10 kΩ cm or more. The through hole 103E has a hollowed column shape on the substrate 102E.

The insulating layer 130E is arranged on a first surface 128E, a second surface 129E of the substrate 102E and a side wall of the through hole 103E. $SiO_2$ is used as the insulating layer 130E. $SiO_2$ is formed by thermal oxidation. The insulating layer 130E may have a structure in which a plurality of insulating layers are stacked. For example, $SiO_2$ may be formed by a CVD method on the $SiO_2$ formed by thermal oxidation. In addition, if necessary, SiN may be formed on $SiO_2$ by a CVD method. If necessary, TiN may be stacked by a sputtering method and $SiO_2$ may be stacked by a CVD method.

The through electrode 112E is arranged further inside the through hole 103E than the insulating layer 130E. The through electrode 112 does not fill the through hole 103E. In other words, the through electrode 112E is arranged with a gap 107E which passes through the inside of the through hole 103E.

An opening portion 114Ea is arranged in the first insulating resin layer 114E. The opening portion 114Ea exposes the through electrode 112E on the side of the first surface 128E of the substrate 102E.

The anode electrode 106E is arranged above the insulating layer 130E on the first surface 128E. The anode electrode 106E is surrounded by the opening portion 114Ea of the first insulating resin layer 114E. The anode electrode 106E is connected to the through electrode 112E.

The cathode electrode 104E is arranged above the first insulating resin layer 114E. An opening portion 104Eb is arranged in the cathode electrode 104E. An end part of the opening portion 104Eb of the cathode electrode 104E surrounds the end part of the opening portion 114Ea of the first insulating resin layer 114E. That is, the cathode electrode 104E is separated from the anode electrode 106E.

Here, in a line segment (corresponding to the line segment $S_1$ in FIG. 21A) which connects at the shortest distance the end parts of the anode electrode 106E and the end part of the opening portion 104Eb of the cathode electrode 104E in a planar view, the ratio of the length $L_1$ from the anode electrode 106E to the end part of the opening portion 114Ea of the first insulating resin layer 114E with respect to the length $L_2$ of the line segment may be ⅓ or more and ⅔ or less.

By such a structure, a high electric field is formed in the vicinity of the cathode electrode 104E and the anode electrode 106E to obtain a high amplification ratio.

Here, patterning of the opening portion 114Ea of the first insulating resin layer 114E in the manufacturing process may deviate from patterning of the anode electrode 106E and the cathode electrode 104E. For example, due to this deviation, the first insulating resin layer 114E may cover a part of the anode electrode 106E or an end part of the opening portion 114Ea of the first insulating resin layer 114E may be covered by the cathode electrode 104E. In these cases, it is not possible to obtain the effect of the detection element according to the present embodiment.

Therefore, it is preferred that the end part of the opening portion 114Ea of the first insulating resin layer 114E is designed to be positioned in the vicinity in the middle between the end part of the anode electrode 106E and the end part of the opening portion 104Eb of the cathode electrode 104E.

Therefore, it is preferred that the end part of the opening portion 114Ea of the first insulating resin layer 114E satisfies a condition as below. A ratio of the length $L_1$ from the anode electrode 106E to the end part of the opening portion 114Ea of the first insulating resin layer 114E with respect to the length $L_2$ of the line segment $S_1$ is ⅜ or more and ⅝ or less. A line segment $S_1$ connects the end part of the anode electrode 106E and the end part of the opening portion 104Eb of the cathode electrode 104E in a planar view at the shortest distance.

As described above, since a high electric field is formed in the vicinity of the cathode electrode 104E and the anode electrode 106E, a high amplification ratio can be obtained. Furthermore, a sufficient design margin is obtained.

In the detection element 190E according to the present embodiment shown in FIG. 21A and FIG. 21B, at a line segment $S_1$ connecting the end part of the anode electrode 106E and the end part of the opening portion 104Eb of the cathode electrode 104E in a planar view at the shortest distance, the ratio of the length $L_1$ from the anode electrode 106E to the end part of the opening portion 114Ea of the first insulating resin layer 114E with respect to the length $L_2$ is was shown to be ½.

In the present embodiment, the anode electrode 106E is circular. The radius of the anode electrode 106E is $R_1$. In the present embodiment, $R_1$ is 30 μm. Furthermore, the through hole 103E is also circular, and the anode electrode 106E is a concentric circle of the through hole 103E.

In the present embodiment, copper (Cu) is used as the material of the anode electrode 106E. The thickness of Cu is preferably about 2 μm or more and about 30 μm or less.

In the present embodiment, the opening portion 104Eb of the cathode electrode 104E is a concentric circle of the anode electrode 106E. The radius of the opening portion 104Eb is $R_2$. In the present embodiment, $R_2$ is 125 μm.

In the present embodiment, copper (Cu) is used as the material of the cathode electrode 104. The thickness of Cu is preferably about 2 μm or more and about 30 μm or less.

It is preferable that the end part of the opening portion 114Ea of the first insulating resin layer 114E is arranged at a position of $(2R_1+R_2)/3$ or more and $(R_1+2R_2)/3$ or less from the center of the cathode electrode 104E and the anode electrode 106E.

With this structure, a high electric field is formed in the vicinity of the cathode electrode 104E and the anode electrode 106E to obtain a high amplification ratio.

When the end part of the opening portion 114Ea of the first insulating resin layer 114E is positioned exceeding $(R_1+2R_2)/3$ from the center of the through hole 103E, the exposed area of the insulating layer 130E increases and it becomes easy for a discharge to occur through the insulating layer 130E. As a result, the insulating layer 130E may break easily.

When the end part of the opening portion 114Ea of the first insulating resin layer 114E is positioned at less than $(2R_1+R_2)/3$ from the center of the through hole 103E, the electric field in the vicinity of the cathode electrode 104E and the anode electrode 106E becomes weak and a sufficient amplification ratio may not be obtained.

In the present embodiment, an end part of the opening portion 114Ea of the first insulating resin layer 114E is arranged at a position $(R_1+R_2)/2$ from the center of the cathode electrode 104E and the anode electrode 106E. That is, the end part of the opening portion 114Ea of the first insulating resin layer 114E is positioned between the end part of the opening portion 104Eb of the cathode electrode 104E and the end part of the anode electrode 106E and is arranged at a position where it is separated from the center portion of the cathode electrode 104E by 77.5 μm and the center portion of the anode electrode 106E.

In the present embodiment, polyimide is used as the first insulating resin layer 114E. The film thickness of the polyimide is preferably 100 μm or less.

The thickness of the insulating layer 130E is preferably 1 μm or more and 50 μm or less. The thickness of the insulating layer 130E can be appropriately selected according to the size of the through hole 103 E in a planar view. For example, the upper limit of the thickness of the insulating layer 130E may be limited to a thickness such that the through hole 103E is not blocked by the insulating layer 130E.

By such a structure, the parasitic capacitance formed between the anode electrode 106E and the substrate 102E is significantly reduced. In this way, an electric field easily concentrates in the vicinity of the cathode electrode 104E and the anode electrode 106E and the amplification ratio improves.

When the thickness of the insulating layer 130E is thinner than the range described above, parasitic capacitance formed between the anode electrode 106E and the substrate 102E becomes large and a high electric field may hardly be formed in the vicinity of the cathode electrode 104E and the anode electrode 106E.

If the thickness of the insulating layer 130E is larger than the range described above, the through hole 103E may be blocked and the anode can not be formed.

The insulating layer may be alternately stacked with a plurality of layers having a tensile stress and a plurality of layers having compressive stress.

By such a structure, warping of the substrate 102 is suppressed.

The anode electrode pattern 108E is arranged on the insulating layer 130E on the second surface 129E side opposite to the first surface 128E. The anode electrode pattern 108E is connected to the through electrode 112E. The second insulating resin layer 116E is arranged on the anode electrode pattern 108E on the second surface 129E side and closes the through hole 103E.

By such a structure, when mounting the detection element 190E on a mounting substrate, it is possible to prevent the resin for mounting from entering into the through hole 103E from the second surface 129E side and reaching the first surface 128E side.

The structure of the detection element according to the present embodiment was explained above. According to the detection element of the present embodiment, since a high electric field is formed in the vicinity of the cathode electrode 104E and the anode electrode 106E, a high amplification ratio can be obtained.

Next, a method of manufacturing the detection element according to the present embodiment is explained in detail. FIG. 22A to FIG. 26B are a planar diagram and a cross-sectional diagram for explaining the method for manufacturing the detection element according to the present embodiment.

Figure 22A:
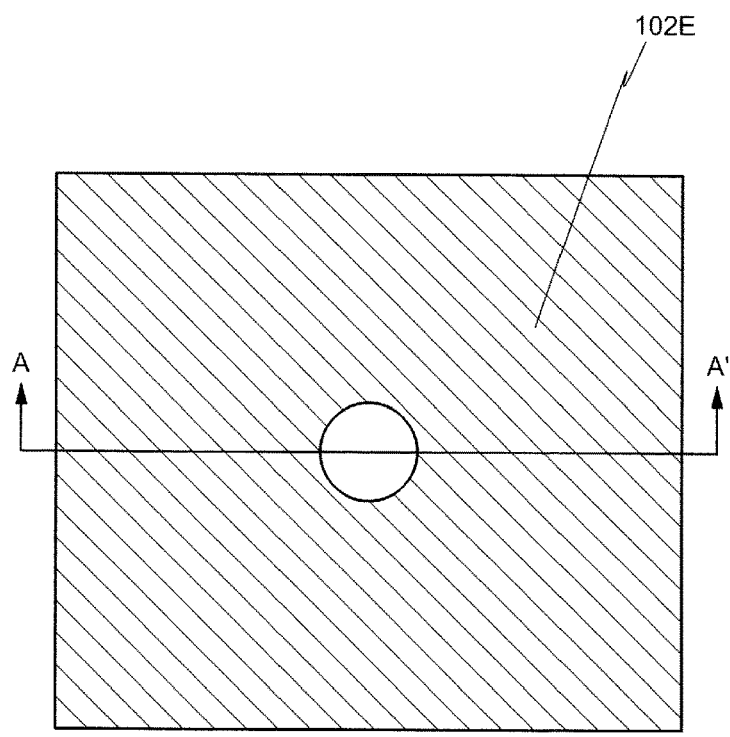
FIG. 22A is a planar diagram showing a manufacturing method of a detection element according to one embodiment of the present disclosure.
Figure 22B:
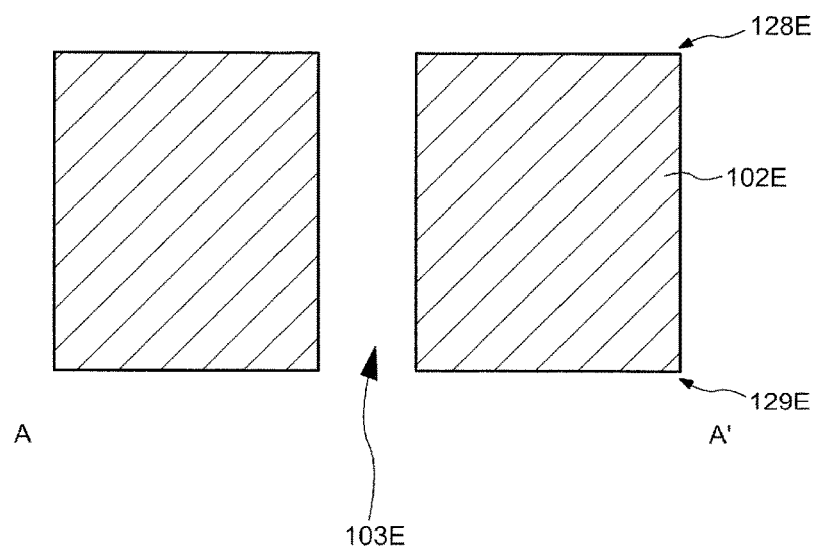
FIG. 22B is a cross-sectional diagram showing a manufacturing method of a detection element according to one embodiment of the present disclosure.
Figure 23A:
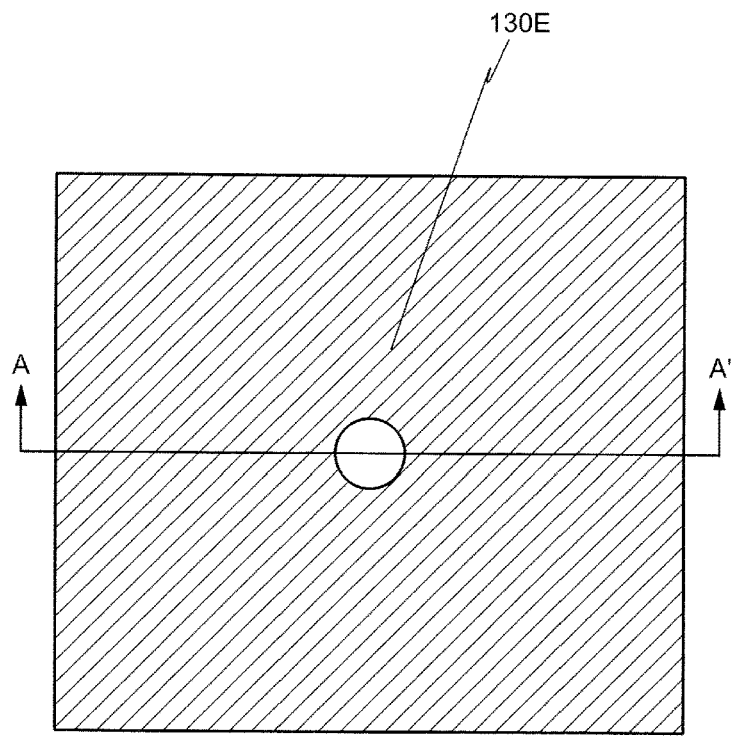
FIG. 23A is a planar diagram showing a method for manufacturing a detection element according to one embodiment of the present disclosure.
Figure 23B:
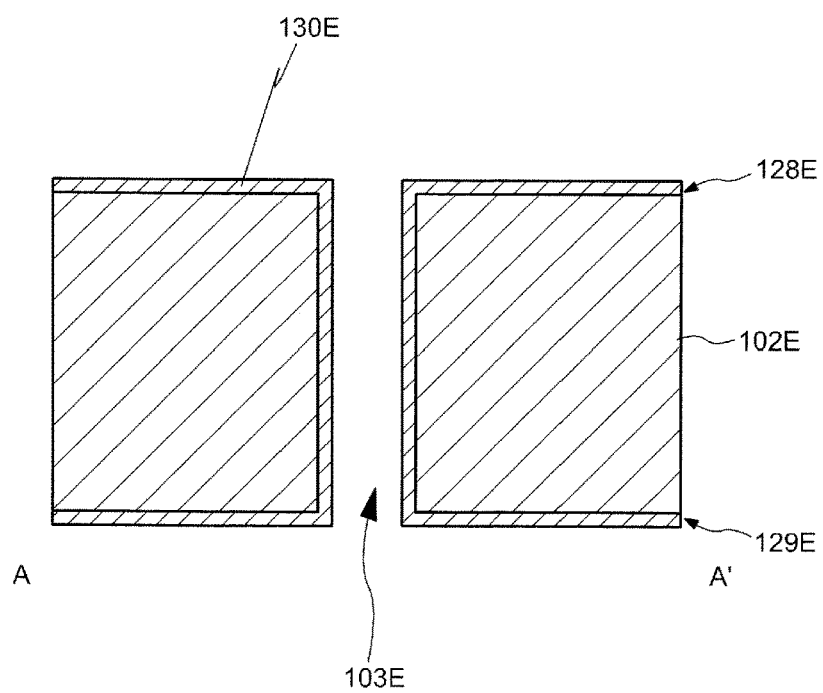
FIG. 23B is a cross-sectional diagram showing a method for manufacturing a detection element according to one embodiment of the present disclosure.

As is shown in FIG. 22A and FIG. 22B, Deep RIE (Reactive Ion Etching) is performed from the side of the first surface 128E of the substrate comprised from Si to form a through hole 103E passing from the first surface 128E to the second surface 129E. Next, by performing a heat treatment in an oxygen atmosphere, as is shown in FIG. 23A and FIG. 23B, an insulating layer 130E comprised from $SiO_2$ is formed on the surface of the substrate 102E. The insulating layer 130E is formed on the first surface 128E, the second surface 129E, and the inner wall of the through hole 103E of the substrate 102E.

Figure 24A:
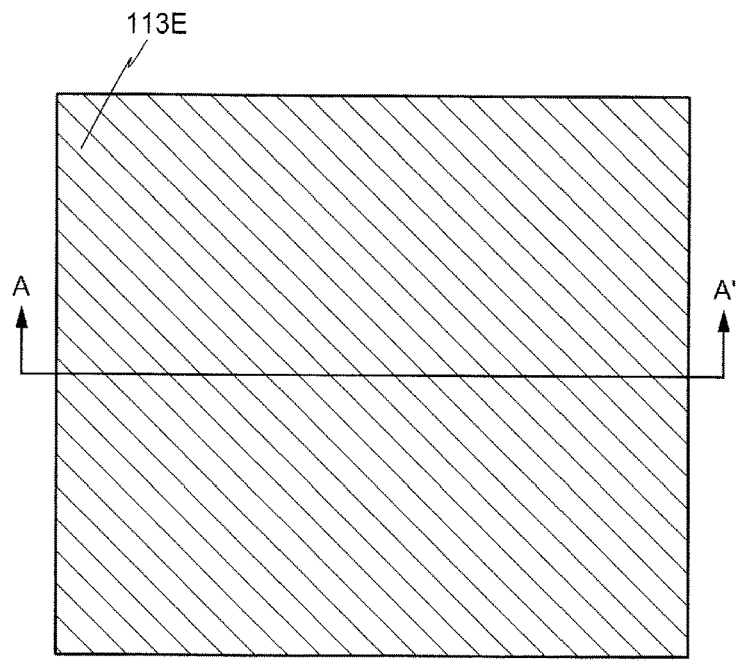
FIG. 24A is a planar diagram showing a manufacturing method of a detection element according to one embodiment of the present disclosure.
Figure 24B:
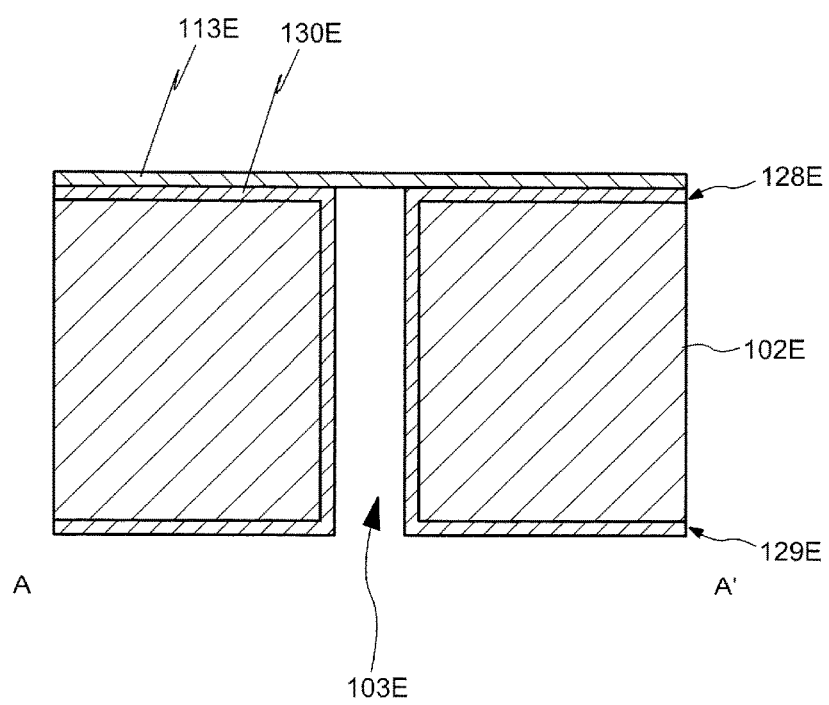
FIG. 24B is a cross-sectional diagram showing a manufacturing method of a detection element according to one embodiment of the present disclosure.

Next, as is shown in FIG. 24A and FIG. 24B, an insulating resin layer 113E comprised from a photosensitive polyimide or the like is formed on the first surface 128E of the substrate 102E.

Figure 25A:
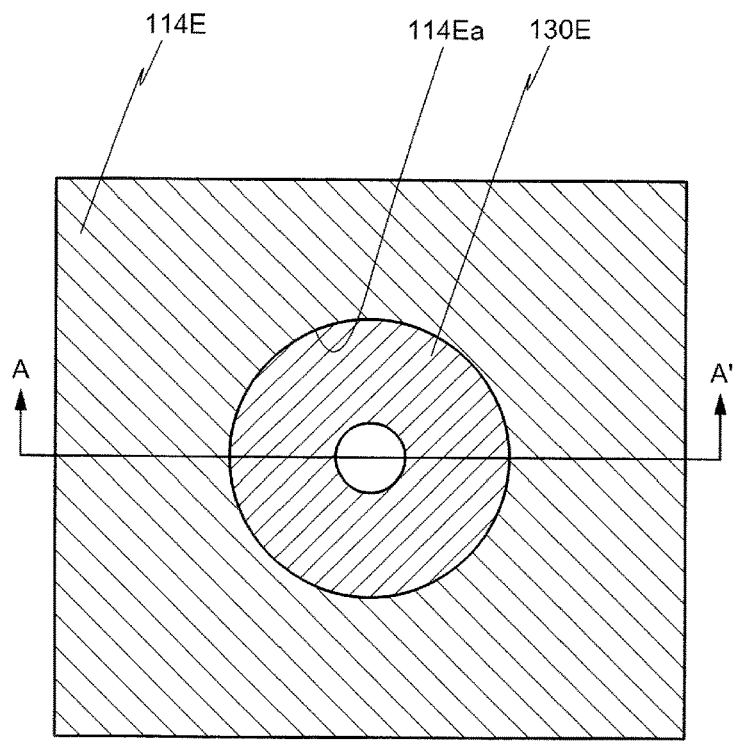
FIG. 25A is a planar diagram showing a manufacturing method of a detection element according to one embodiment of the present disclosure.
Figure 25B:
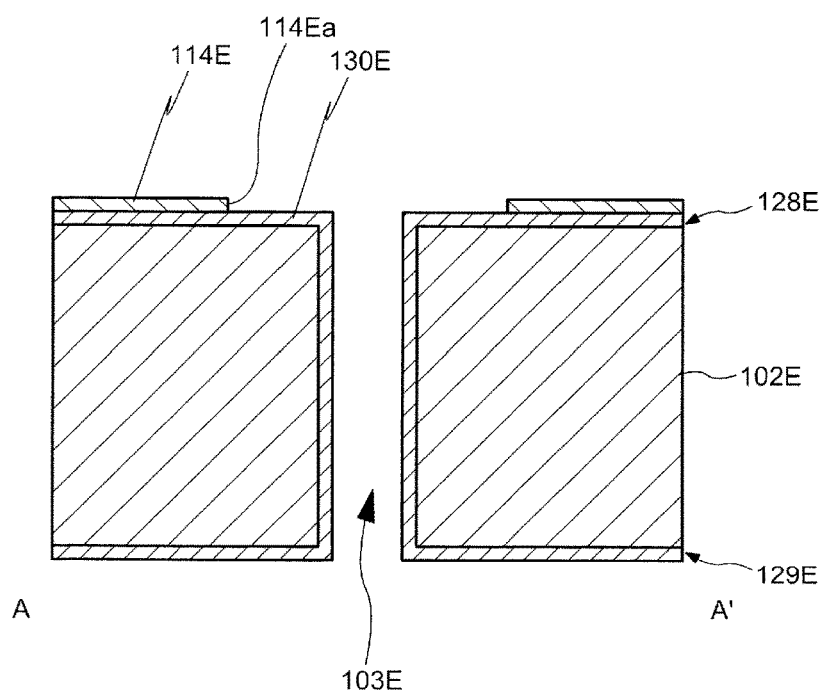
FIG. 25B is a cross-sectional diagram showing a manufacturing method of a detection element according to one embodiment of the present disclosure.

Next, as is shown in FIG. 25A and FIG. 25B, photolithography is performed on the insulating resin layer 113E to form the first insulating resin layer 114E arranged with the opening portion 114Ea on the first surface 128E of the substrate 102E.

Figure 26A:
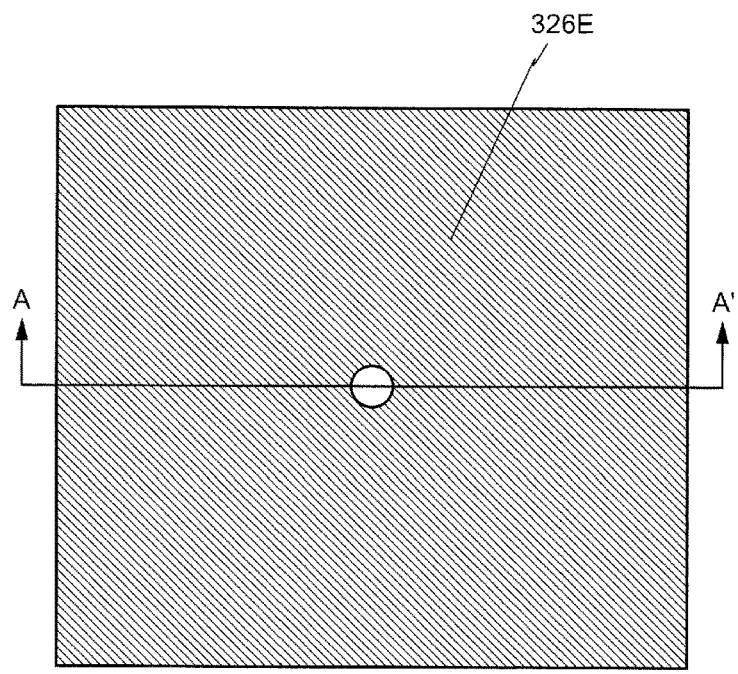
FIG. 26A is a planar diagram showing a method of manufacturing a detection element according to one embodiment of the present disclosure.
Figure 26B:
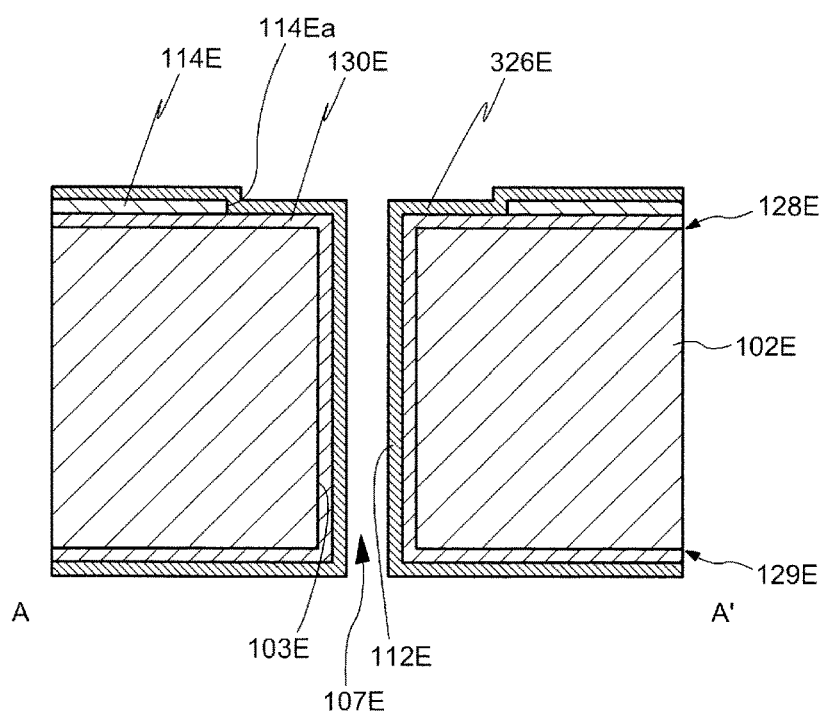
FIG. 26B is a cross-sectional diagram showing a method of manufacturing a detection element according to one embodiment of the present disclosure.

Next, as is shown in FIG. 26A and FIG. 26B, a seed layer is formed on the first surface 128E, the second surface 129E and the inner wall of the through hole 103E of the substrate 102E. The seed layer can be formed by any one of electroless plating, sputtering, vapor deposition or a combination of these methods. After the seed layer is formed, a current is passed through the seed layer and a plating process is performed to form a plating layer 326E on the seed layer. For the convenience of explanation, the seed layer is omitted and only the plating layer 326E is shown in FIG. 26B.

Following this, photolithography is performed on the plating layer 326E and patterning is performed, thereby forming the cathode electrode 104E and the anode electrode 106E shown in FIG. 21A and FIG. 21B. Next, the second insulating resin layer 116E comprised from a photosensitive polyimide or the like is formed on the second surface 129E of the substrate 102E and the detection element 190E according to the present embodiment can be obtained.

Seventh Embodiment

Figure 27A:
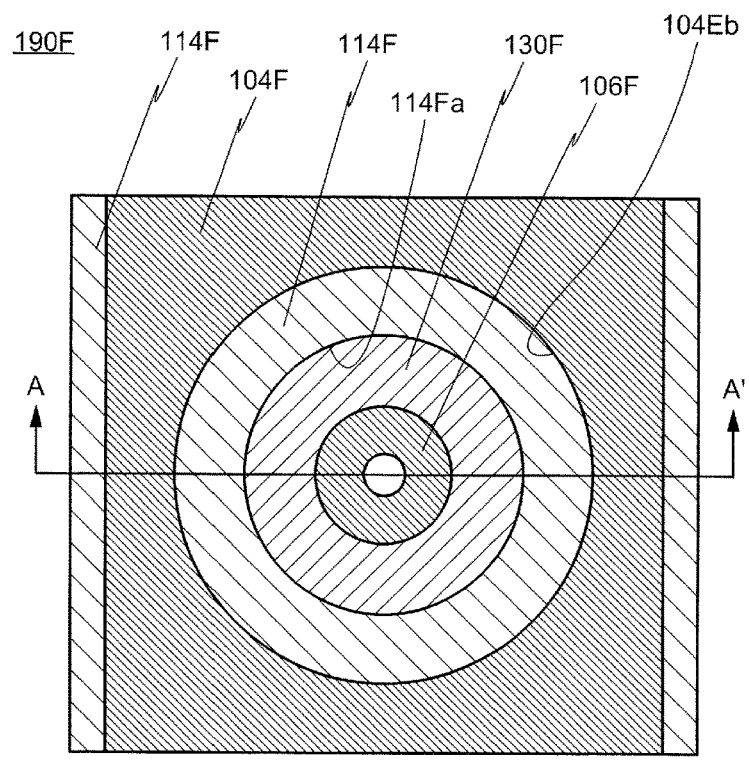
FIG. 27A is a planar diagram of a part of a detection element according to one embodiment of the present disclosure.
Figure 27B:
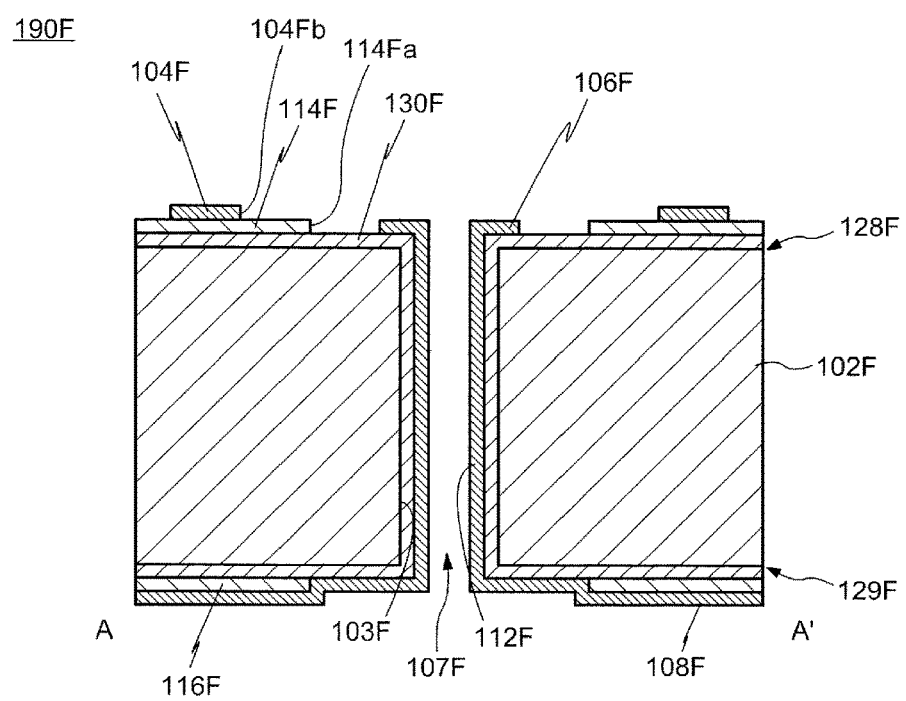
FIG. 27B is a cross-sectional diagram of a part of a detection element according to one embodiment of the present disclosure.

The structure of the detection element according to the seventh embodiment of the present disclosure is explained in detail while referring to FIG. 27A and FIG. 27B. FIG. 27A and FIG. 27B are a planar diagram and a cross-sectional diagram of a part of a detection element according to one embodiment of the present disclosure. FIG. 27A is a planar diagram of the detection element 190F. FIG. 27B is a cross-sectional diagram of the detecting element 190F along the line A-A' in FIG. 27A.

When the detection element 190F according to the present embodiment is compared with the detection element 190E according to the sixth embodiment, the structure on the second surface 129F side of the substrate 102F of the detection element 190F is different from the structure of the second surface 129E side of the substrate 102E of the detection element 190E.

That is, on the first surface 128F side, the substrate 102F has a region in which the insulating layer 130F, the first insulating resin layer 114F, and the cathode electrode 104F are stacked in this order from the substrate 102F side. On the other hand, on the second surface 129F side, the substrate 102F has a region in which the insulating layer 130F, the second insulating resin layer 116F, and the anode electrode pattern 108F are stacked in this order from the substrate 102F side.

By such a structure, it is possible to suppress warpage of the substrate 102F.

In addition, in the detection element 190F according to the present embodiment, a space on the first surface 128F side of the substrate 102F and a space on the second surface 129F side of the substrate 102F are continuous through a gap 107F.

By such a structure, even if foreign matter enters into the through hole 103F, it is possible to easily remove the foreign matter from the through hole 103F.

Eighth Embodiment

Figure 28A:
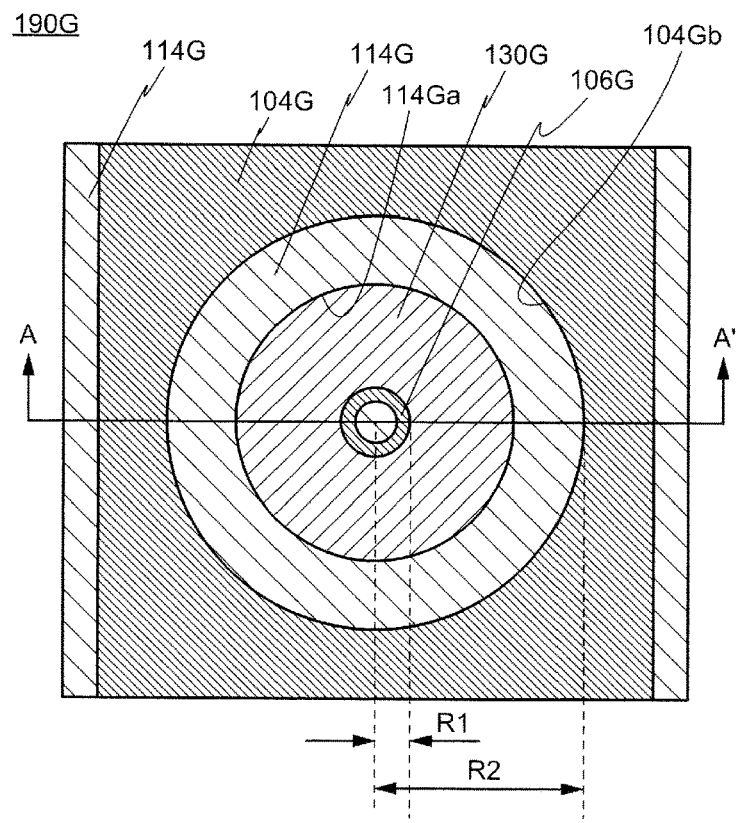
FIG. 28A is a planar diagram of a part of a detection element according to one embodiment of the present disclosure.
Figure 28B:
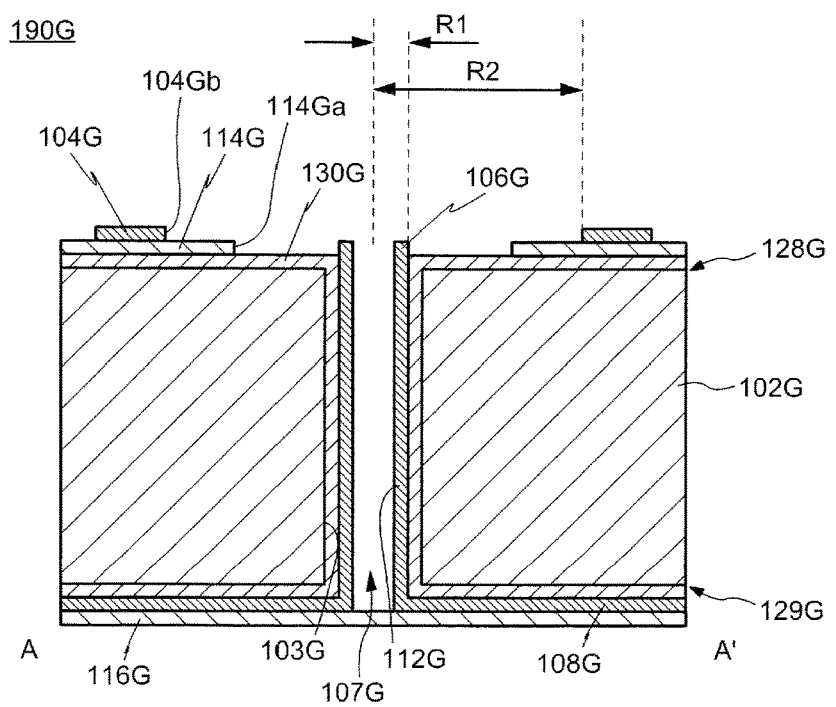
FIG. 28B is a cross-sectional diagram of a part of a detection element according to one embodiment of the present disclosure.

A structure of a detection element according to an eighth embodiment of the present disclosure is explained in detail while referring to FIG. 28A and FIG. 28B. FIG. 28A and FIG. 28B are a planar diagram and a cross-sectional diagram of a part of a detection element according to one embodiment of the present disclosure. FIG. 28A is a planar diagram of the detection element 190G. FIG. 28B is a cross-sectional diagram of the detection element 190G along the line A-A' in FIG. 28A.

When the detection element 190G according to the present embodiment is compared with the detection element 190E according to the sixth embodiment, the structure of the anode electrode 106G of the detection element 190G is different from the structure of the anode electrode 106E of the detection element 190E.

As is shown in FIG. 28B, the anode electrode 106G has a shape protruding upward from the through electrode 112G. That is, the anode electrode 106G is arranged in substantially the same region as the through electrode 112G in the planar view of FIG. 28A. In other words, the radius $R_1$ of the anode electrode 106G is equal to the radius of the through electrode 112G.

By such a structure, the area of the anode electrode 106G is reduced. In this way, the electric field concentrates in the vicinity of the anode electrode 106, thereby a high electric field is easily formed. Therefore, a high amplification ratio can be obtained.

Ninth Embodiment

Figure 29A:
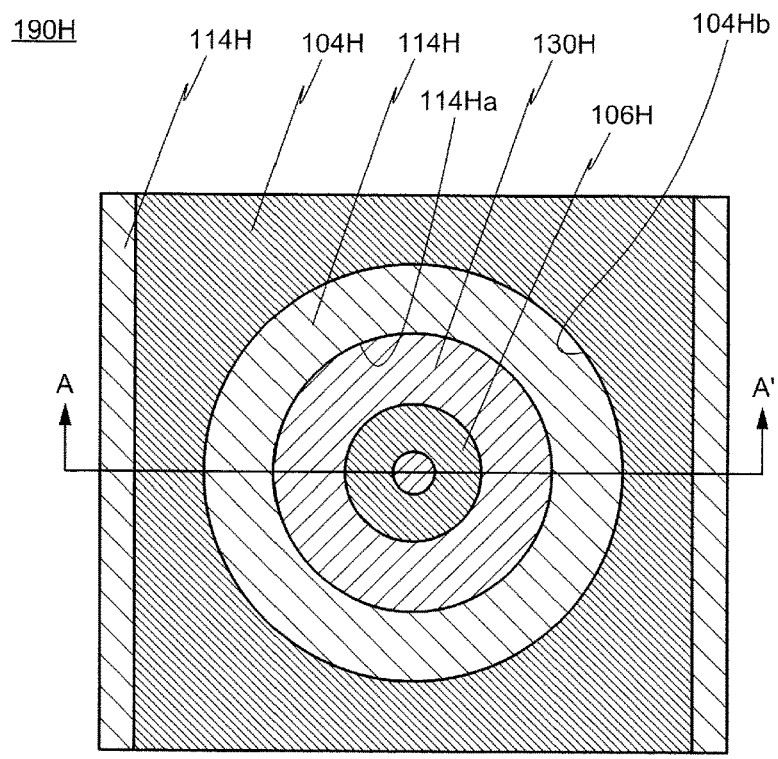
FIG. 29A is a planar diagram of a part of a detection element according to one embodiment of the present disclosure.
Figure 29B:
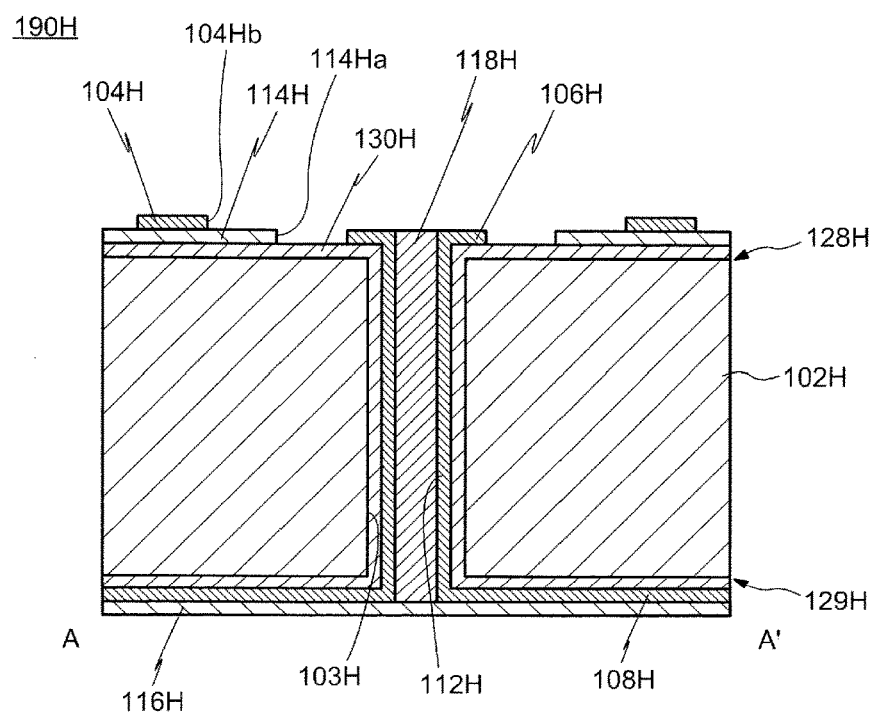
FIG. 29B is a cross-sectional diagram of a part of a detection element according to one embodiment of the present disclosure.

A structure of a detection element according to a ninth embodiment of the present disclosure is explained in detail while referring to FIG. 29A and FIG. 29B. FIG. 29A and FIG. 29B are a planar diagram and a cross-sectional diagram of a part of a detection element according to one embodiment of the present disclosure. FIG. 29A is a planar diagram of the detection element 190H. FIG. 29B is a cross-sectional diagram of the detection element 190H along the line A-A' in FIG. 29A.

When the detection element 190H according to the present embodiment is compared with the detection element 190E according to the sixth embodiment, the detection element 190H is different from the detection element 190E in that the inside of the through hole 103H is filled with the resin 118H. The resin 118H may be insulating or electrically conductive. The material filling the inside of the through hole 103H is not limited to a resin and may be a conductive paste such as silver (Ag) or copper (Cu).

By such a structure, it is possible to prevent foreign matter from entering the through hole 103H during the manufacturing process of the detection element 190H.

Tenth Embodiment

Figure 30A:
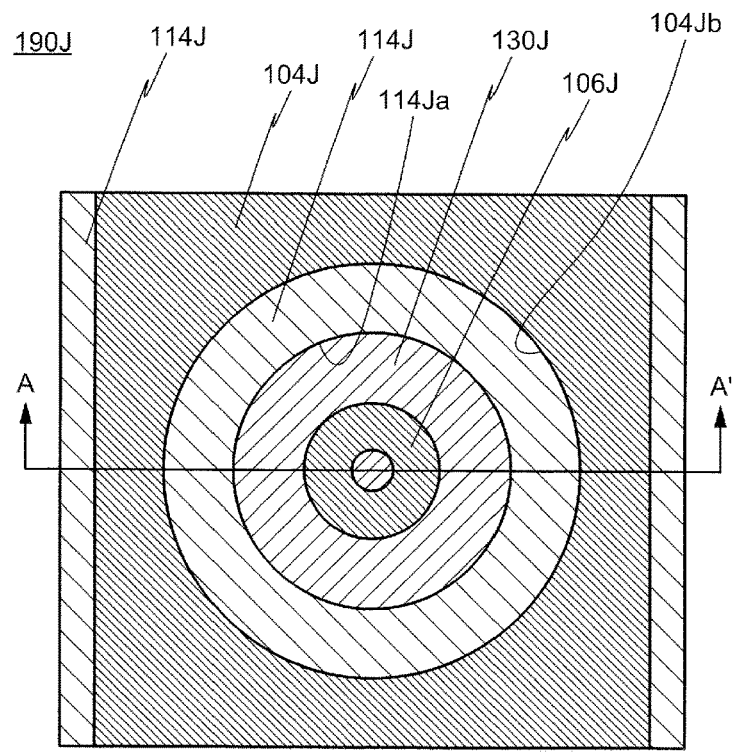
FIG. 30A is a planar diagram of a part of a detection element according to one embodiment of the present disclosure.
Figure 30B:
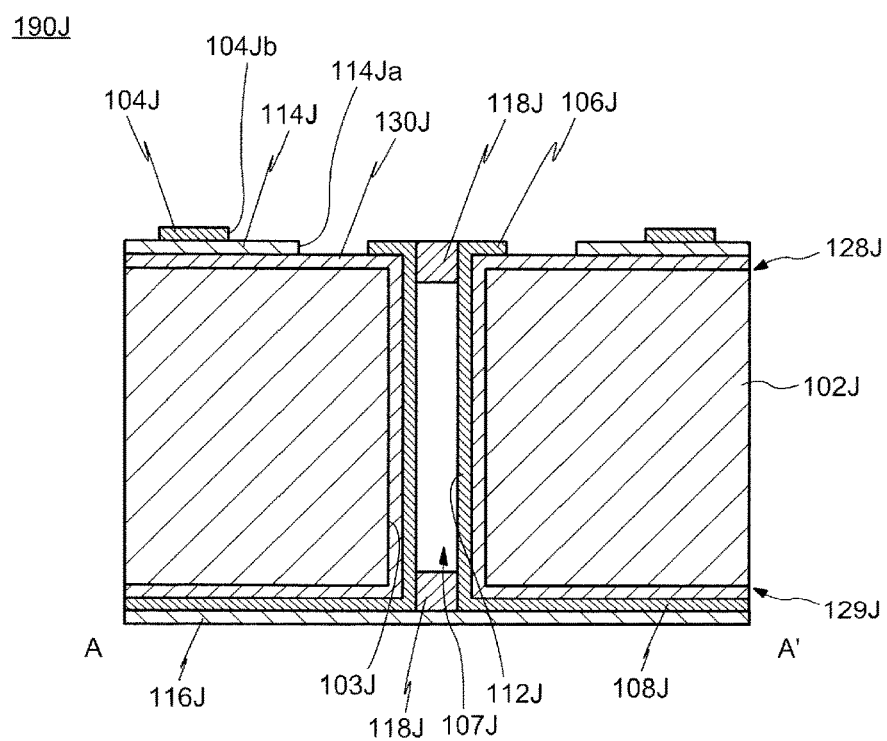
FIG. 30B is a cross-sectional diagram of a part of a detection element according to one embodiment of the present disclosure.

A structure of a radiation detection device according to a tenth embodiment of the present disclosure is explained in detail while referring to FIG. 30A and FIG. 30B. FIG. 30A and FIG. 30B are a planar diagram and a cross-sectional diagram of a part of a detection element according to one embodiment of the present disclosure. FIG. 30A is a planar diagram of the detection element 190J. FIG. 30B is a cross-sectional diagram of the detecting element 190J along the line A-A' in FIG. 30A.

When the detection element 190J according to the present embodiment is compared with the detection element 190H according to the ninth embodiment, the detection element 190J is different from the detection element 190H in that a gap 107J is arranged in the through hole 103J.

In the detection element 190J according to the present embodiment, both end parts of the gap 107J are closed by a resin 118J. That is, the gap 107J is surrounded by the through electrode 112J and the resin 118J.

By such a structure, it is possible to prevent foreign matter from entering the through hole 103J during the manufacturing process of the detection element 190J. In addition, since the resin 118J may be formed in the vicinity of the first surface 128J and the second surface 129J of the through hole 103J, it is not necessary to fill the through hole 103J with the resin 118J and thereby the amount of resin material which is used can be suppressed.

Eleventh Embodiment

Figure 31A:
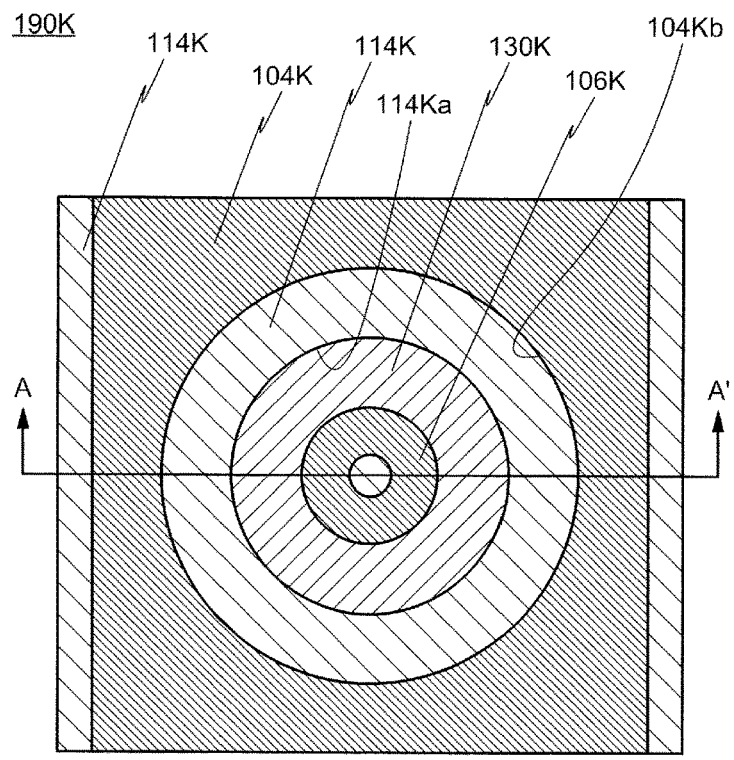
FIG. 31A is a planar diagram of a part of a detection element according to one embodiment of the present disclosure.
Figure 31B:
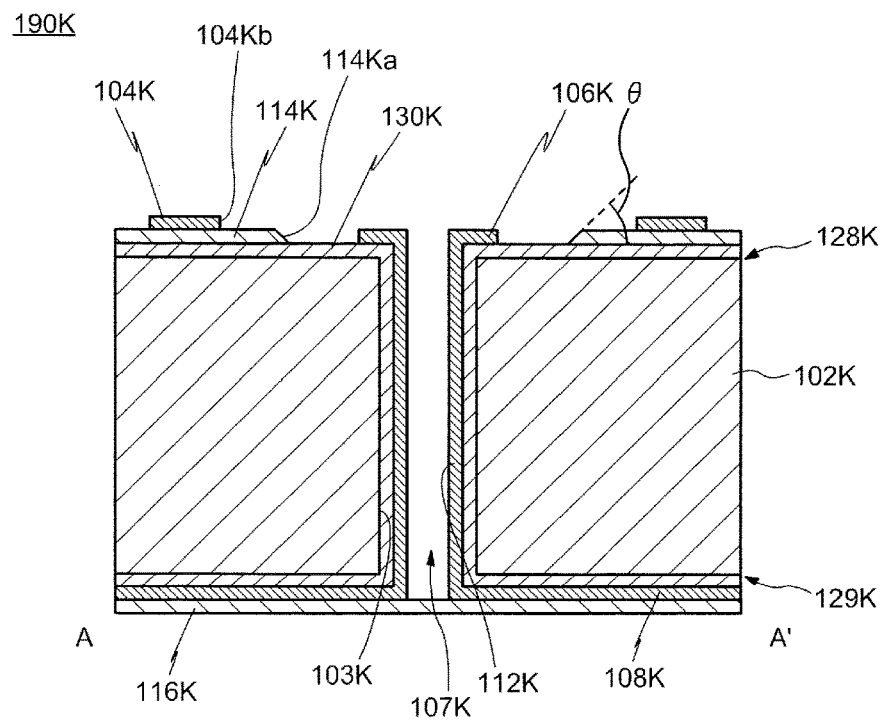
FIG. 31B is a cross-sectional diagram of a part of a detection element according to one embodiment of the present disclosure.

The structure of a detection element according to the eleventh embodiment of the present disclosure is explained in detail while referring to FIG. 31A and FIG. 31B. FIG. 31A and FIG. 31B are a planar diagram and a cross-sectional diagram of a part of a detection element according to one embodiment of the present disclosure. FIG. 31A is a planar diagram of the detection element 190K. FIG. 31B is a cross-sectional diagram of the detection element 190K along the line A-A' in FIG. 31A.

When the detection element 190K according to the present embodiment is compared with the detection element 190E according to the sixth embodiment, the cross-sectional shape of the first insulating resin layer 114K of the detection element 190K is different from the cross-sectional shape of the first insulating resin layer 114E of the detection element 190E.

In the detection element 190K according to the present embodiment, the opening portion 114Ka of the first insulating resin layer 114K has a tapered shape having a size which increases with distance from the substrate. In other words, the side wall of the first insulating resin layer 114K in the opening portion 114Ka is inclined and the slope of the side wall faces upward. The angle formed by the sidewall of the first insulating resin layer 114K at the opening portion 114Ka and the first surface 128K of the substrate 102K is θ.

By such a structure, since an electric field concentrates in the vicinity of the cathode electrode 104K and the anode electrode 106K, a high electric field is easily formed. Therefore, a high amplification ratio can be obtained.

The inclination angle θ of the inclined surface of the first insulating resin layer 114K at the opening portion 114Ka is preferably 20° or more and 80° or less.

Twelfth Embodiment

In the present embodiment, another example of the radiation detection device of the present disclosure is explained. Since the detection element 190L of the twelfth embodiment has the same structure as the detection elements of the first to eleventh embodiments, the same structure is not explained again. Furthermore, the radiation detection device is also called a container module.

Figure 32:
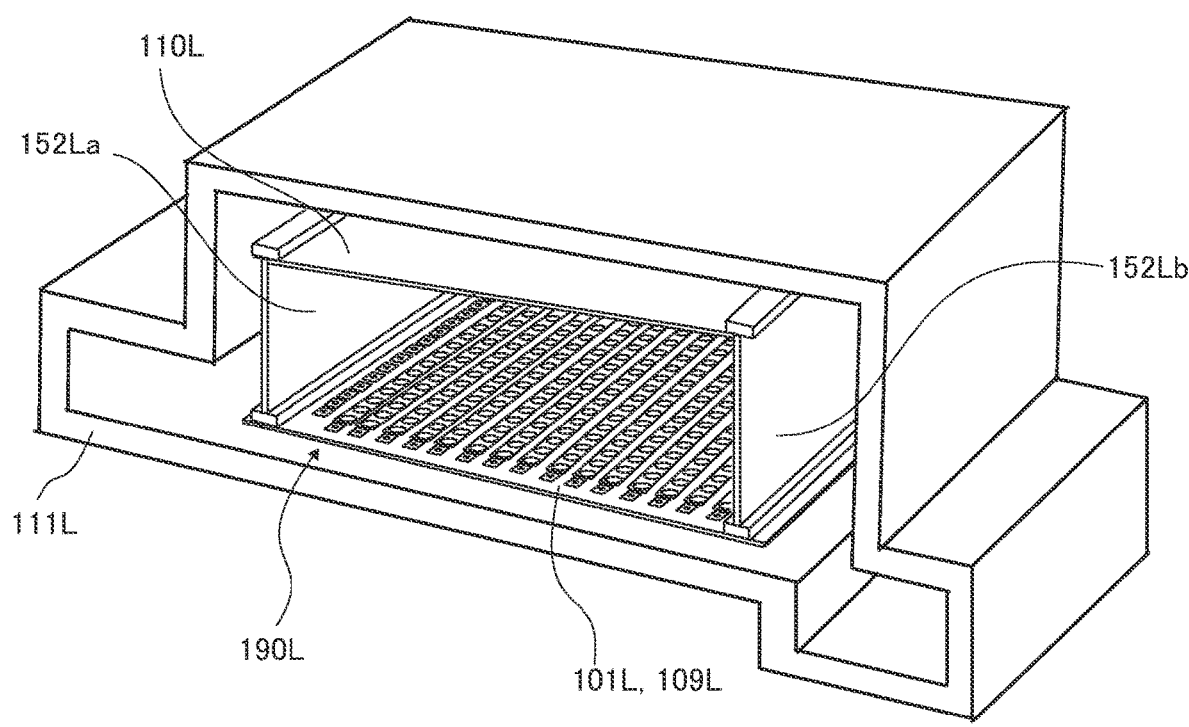
FIG. 32 is a cross-sectional perspective diagram of a radiation detection device (container module) according to one embodiment of the present disclosure.

FIG. 32 is a cross-sectional perspective diagram of the radiation detection device 150L according to the present disclosure according to the present embodiment. Similar to the first to eleventh embodiments, the radiation detection device 150L of the present disclosure according to the present embodiment includes a pixel electrode portion 101L, a connection terminal portion 109L, a drift electrode 110L and a chamber 111L. In addition, in the radiation detection device 150L according to the present disclosure according to the present embodiment, drift cages 152La and 152Lb are arranged. The drift cages 152La and 152Lb are arranged in order to make the electric field distribution uniform between the drift electrode 110L and the pixel electrode portion 101L. Here, the radiation detection device of the present disclosure according to this embodiment is referred to as a container module.

According to one embodiment of the present disclosure, it is possible to provide a detection element which can obtain a high-resolution radiation image having a high signal intensity and a high S/N ratio. Alternatively, according to one embodiment of the present invention, a sufficiently high electric field can be provided in the vicinity of a pixel electrode, and a detection element which can obtain a sufficiently high amplification ratio can be provided.

EXPLANATION OF THE REFERENCE SYMBOLS

100: radiation detection device, 101: pixel electrode portion, 102: substrate, 103: through hole, 104: cathode electrode, 104a: electrode, 104Eb, 105, 114Ea: opening portion, 106: anode electrode, 107E: gap, 108: anode electrode pattern, 109: connection terminal portion, 110: drift electrode, 111: chamber, 112: through electrode, 113E: insulating resin layer, 114E: first insulating resin layer, 116E: second insulating resin layer, 118H: resin, 120: first metal layer 122: second metal layer, 124: third metal layer, 126: via, 128: first surface, 129: second surface, 130: insulation layer, 132: bonding wire, 134: first metal layer, 136: second metal layer, 138: third insulating layer, 139: fourth insulating layer, 140: resin layer, 141: opening portion, 142: resin layer, 143: opening portion, 150: radiation detection device, 152a: drift cage, 160: first anode electrode, 162: second anode electrode, 325: seed layer, 326: plating layer, 329: resist pattern, 330: adhesive layer, 340: frame

What is claimed is:

1. A detection element comprising:
   a substrate having a through hole;
   an insulating layer arranged inside of the through hole;
   a through electrode arranged further to the inner side of the through hole than the insulating layer;
   a resin layer having insulating properties and having an opening portion exposing the through electrode;
   a first electrode arranged above or below the through electrode and an outer surface of the resin layer, the first electrode being connected to the through electrode through the opening portion; and
   a second electrode arranged above or below the outer surface of the resin layer, the second electrode being separated from the first electrode;
   wherein a part of the resin layer is in contact with the through electrode,
   the first electrode and the second electrode protrude outward more than the outer surface of the resin layer,
   side surfaces of the first electrode and the second electrode are exposed from the resin layer,
   the through hole overlaps with the opening portion in planar view, and
   an outline of the through hole surrounds an outline of the opening portion in planar view.

2. The detection element according to claim 1, further comprising a third electrode,
   wherein
   the substrate has a first surface and a second surface on the opposite side to the first surface with respect to the substrate,
   the third electrode is arranged on the second surface, and
   a direction in which the second electrode extends and a direction in which the third electrode extends mutually intersect each other.

3. The detection element according to claim 2, wherein
   a plurality of the first electrodes are arranged and
   the plurality of the first electrodes are arranged in a matrix shape along a direction in which the second electrode extends and along a direction in which the third electrode extends.

4. The detection element according to claim 1, wherein the second electrode is opened so as to surround the first electrode.

5. The detection element according to claim 1, wherein a first opening size of the opening portion is smaller than a size of the through electrode in a region where the through electrode and the resin layer are in contact.

6. The detection element according to claim 1, wherein a thickness of the insulating layer is 0.1 µm or more and 35 µm or less.

7. The detection element according to claim 1, wherein
the insulating layer includes a silicon oxide layer and a silicon nitride layer, and
the silicon nitride layer is arranged further to the inner side of the through hole than the silicon oxide layer.

8. The detection element according to claim 1, wherein the insulating layer has a structure where a plurality of silicon oxide layers and a plurality of silicon nitride layers stack with each other alternately.

9. The detection element according to claim 1, wherein a size of the first electrode is larger than a size of a second opening in an upper part of the opening portion.

10. The detection element according to claim 1, wherein a size of the first electrode is substantially the same as a size of the second opening in an upper part of the opening portion.

11. The detection element according to claim 1, wherein a size of the first electrode is smaller than a size of the second opening in an upper part of the opening portion.

12. The detection element according to claim 1, wherein the opening portion has a taper shape where a size of the opening portion increases according to a difference from the substrate.

\* \* \* \* \*